(12) United States Patent
Fujita et al.

(10) Patent No.: US 8,432,475 B2
(45) Date of Patent: Apr. 30, 2013

(54) IMAGING DEVICE

(75) Inventors: Hideto Fujita, Moriguchi (JP); Clarissa Leung, Moriguchi (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 178 days.

(21) Appl. No.: 12/920,802

(22) PCT Filed: Feb. 24, 2009

(86) PCT No.: PCT/JP2009/053241
§ 371 (c)(1),
(2), (4) Date: Sep. 2, 2010

(87) PCT Pub. No.: WO2009/110348
PCT Pub. Date: Sep. 11, 2009

(65) Prior Publication Data
US 2011/0019027 A1    Jan. 27, 2011

(30) Foreign Application Priority Data
Mar. 3, 2008   (JP) .................................. 2008-051676

(51) Int. Cl.
*H04N 5/222* (2006.01)

(52) U.S. Cl.
USPC .................................................... 348/333.02

(58) Field of Classification Search .............. 348/333.02
See application file for complete search history.

(56) References Cited

U.S. PATENT DOCUMENTS

| | | | |
|---|---|---|---|
| 5,416,543 A | 5/1995 | Stephenson | |
| 7,423,669 B2 * | 9/2008 | Oya et al. ................. | 348/208.14 |
| 2001/0002843 A1 | 6/2001 | Yata | |
| 2007/0064977 A1 | 3/2007 | Nagata | |

FOREIGN PATENT DOCUMENTS

| | | |
|---|---|---|
| JP | 05284411 | 10/1993 |
| JP | 09-074504 | 3/1997 |
| JP | 9074504 | 3/1997 |
| JP | 09-322049 | 12/1997 |
| JP | 9322049 | 12/1997 |
| JP | 11-146317 | 5/1999 |
| JP | 200048211 | 2/2000 |
| JP | 2000105819 | 4/2000 |
| JP | 2001169169 | 6/2001 |

(Continued)

OTHER PUBLICATIONS

Tetsuji Haga, et al.; "Intruder Detection and Tracking Camera", English translation included.

(Continued)

*Primary Examiner* — James Hannett
(74) *Attorney, Agent, or Firm* — NDQ&M Watchstone LLP

(57) ABSTRACT

An imaging device includes: a tracking processing portion which tracks a tracking target on a series of frame images based on an output signal of an image sensor; a tracking reliability evaluation portion which, based on the output signal of the image sensor, evaluates a degree of reliability of tracking by the tracking processing portion, and classifies the degree into one of a plurality of levels; and a display portion which displays the series of frame images. A tracking target icon corresponding to a tracking target and a level icon indicating an evaluated degree of reliability are displayed on a display screen. A degree of reliability is classified into one of a plurality of levels and indicated by the level icon. The tracking target icon is expressed by using the same color as that of (the clothes of) the tracking target.

14 Claims, 15 Drawing Sheets

FOREIGN PATENT DOCUMENTS

| | | |
|---|---|---|
| JP | 200672770 | 3/2006 |
| JP | 2006211139 | 8/2006 |
| JP | 200788611 | 4/2007 |
| JP | 2007301166 | 11/2007 |

OTHER PUBLICATIONS

Japan Patent Office; Notification of Grounds for Rejection in Japanese Patent Application No. 2008-051676 mailed Nov. 8, 2011.

Chinese Office Action for counterpart Chinese Application No. 200980107707.X, dated Apr. 17, 2012.

Catalog of EXILM, with partial English translation of relevant portions, p. 4, Nov. 2007.

International Search Report from PCT/JP2009/053241, dated Apr. 21, 2009.

* cited by examiner

FIG. 7
TRACKING MODE ICON
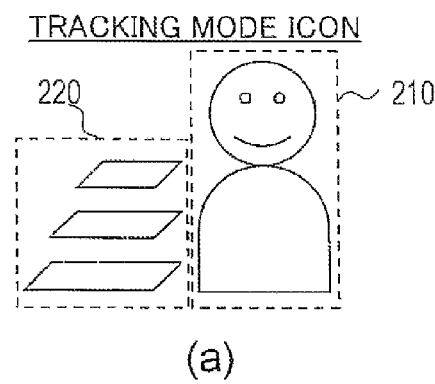
(a)
TRACKING TARGET ICON
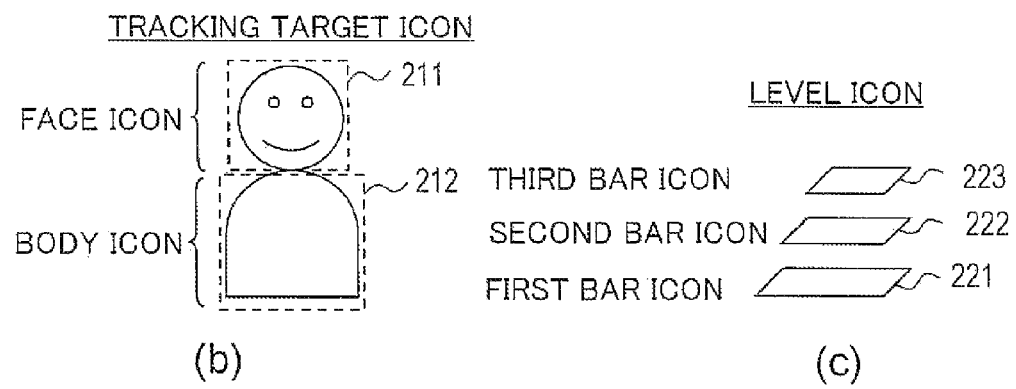
(b)                                              (c)

INITIAL SETTING FRAME IMAGE

DIPLAY IMAGE

FIG. 13
RELIABILITY: HIGH   RELIABILITY: MEDIUM   RELIABILITY: LOW
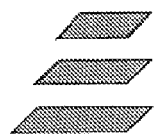   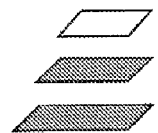   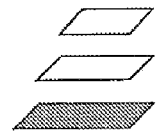
(a)   (b)   (c)
FIG. 14
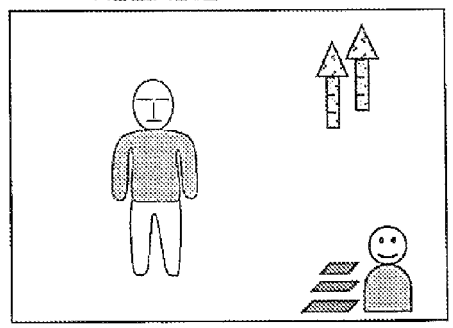
(a) RELIABILITY: HIGH
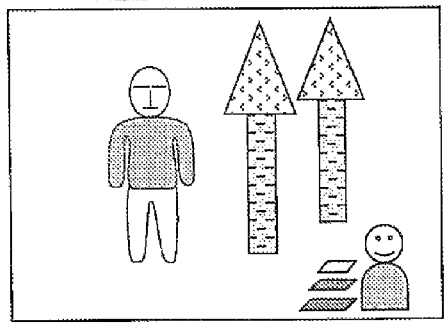
(b) RELIABILITY: MEDIUM
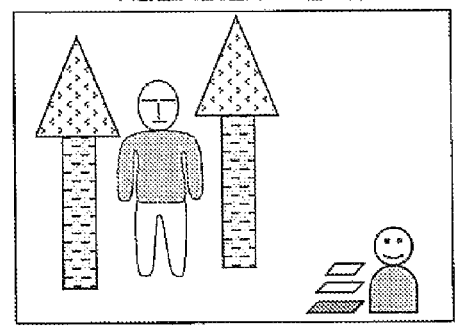
(c) RELIABILITY: LOW
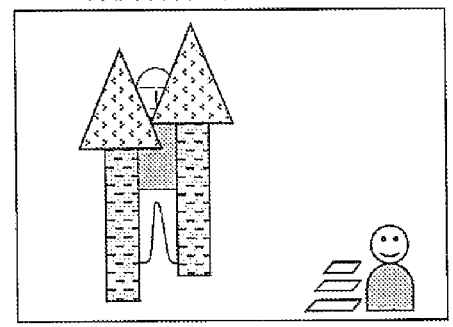
(d) TRACKING IMPOSSIBLE FIG. 15
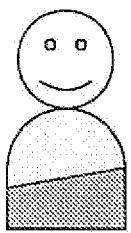
FIG. 16
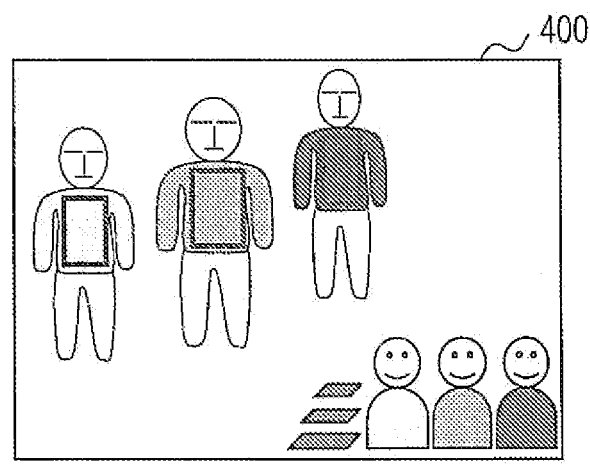
(a)
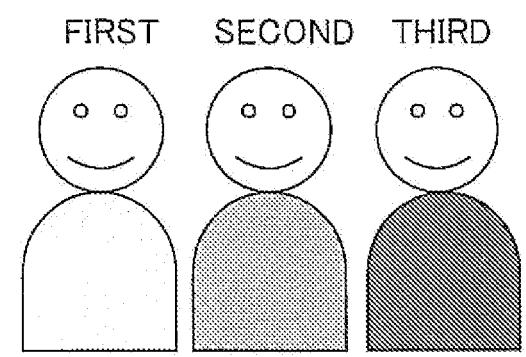
(b)

FIG. 17

HIGHLIGHT TRACKING
TARGET ICONS FOR
ACTUALLY TRACKED PERSONS

FIRST SECOND THIRD

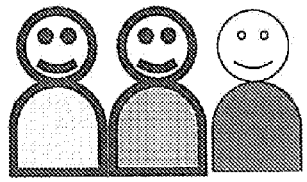

(a)

HIGHLIGHT TRACKING
TARGET ICONS FOR
ACTUALLY TRACKED PERSONS

FIRST SECOND THIRD

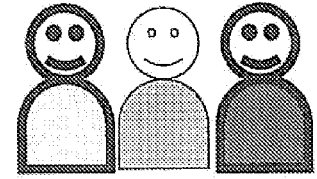

PLACE TRACKING TARGET
ICONS FOR ACTUALLY
TRACKED PERSONS
CLOSER TO LEVEL ICON

FIRST SECOND THIRD

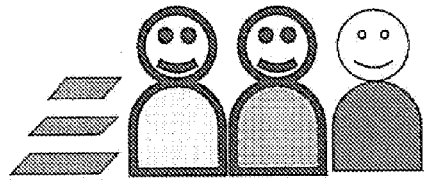

(a)

PLACE TRACKING TARGET
ICON FOR ACTUALLY
TRACKED PERSON
CLOSEST TO LEVEL ICON

THIRD FIRST SECOND

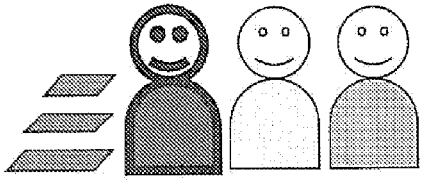

REFLECT HIGHEST RELIABILITY IN
LEVEL ICON AND PLACE TRACKING
TARGET ICON CORRESPONDING TO
HIGHEST RELIABILITY CLOSEST
TO LEVEL ICON

SECOND THIRD FIRST

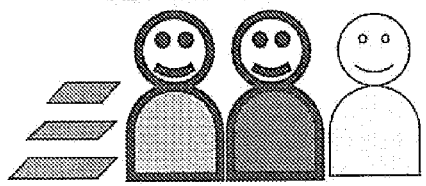

(a)

REFLECT LOWEST RELIABILITY IN
LEVEL ICON AND PLACE TRACKING
TARGET ICON CORRESPONDING TO
LOWEST RELIABILITY CLOSEST
TO LEVEL ICON

THIRD SECOND FIRST

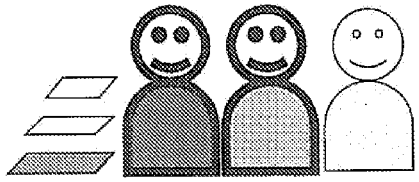

(b)

FIG. 20
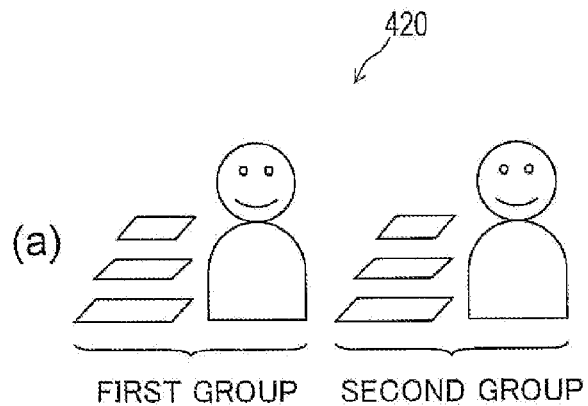
DISPLAY ICONS CORRESPONDING TO
HIGHEST RELIABILITY AND
LOWEST RELIABILITY
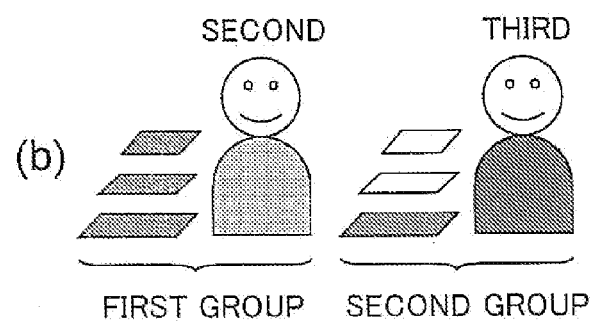
FIG. 21
CHANGE DISPLAY SIZE
ACCORDING TO
TRACKING PRIORITY
CHANGE DISPLAY SIZE
ACCORDING TO
TRACKING PRIORITY
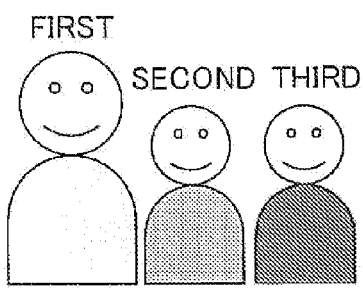
(a)
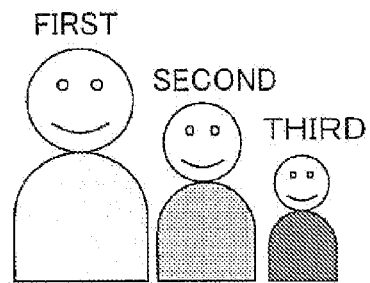
(b)

FIG. 22
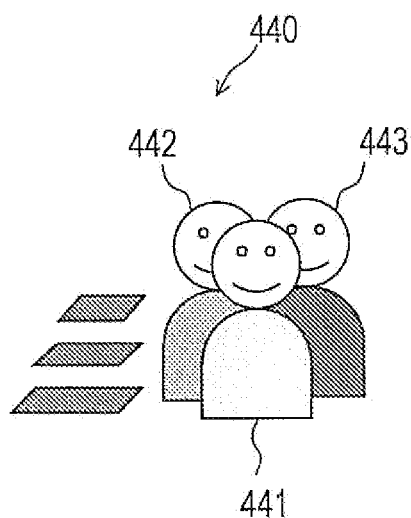
FIG. 23
| RELIABILITY: HIGH | RELIABILITY: MEDIUM | RELIABILITY: LOW |
|---|---|---|
|  | 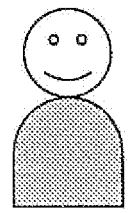 | 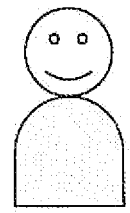 |
| (a) | (b) | (c) |

(a)　　　(b)

(a)　　　(b)

FIG. 27
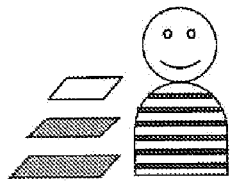
FIG. 28
MOTION AMOUNT ICON
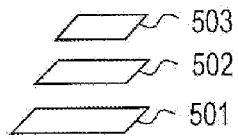
FIG. 29
| MOTION AMOUNT: LARGE | MOTION AMOUNT: MEDIUM | MOTION AMOUNT: SMALL | MOTION AMOUNT: VERY SMALL OR NONE |
|---|---|---|---|
| 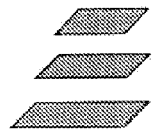 | 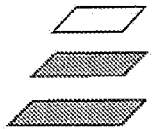 | 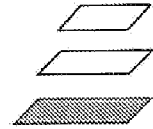 | 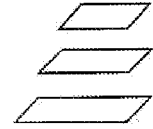 |
| (a) | (b) | (c) | (d) |
Fig. 30
LEVEL ICON
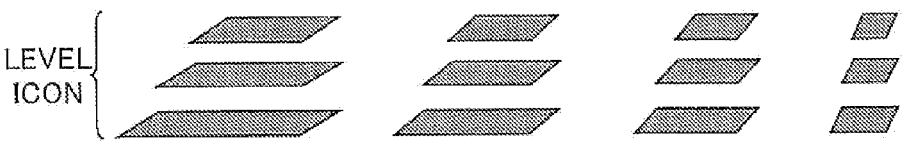
LARGE ←——————— MOTION AMOUNT ———————→ SMALL

IMAGING DEVICE

CROSS REFERENCE TO RELATED APPLICATIONS

This national stage application claims benefit to International Application No. PCT/JP2009/053241, filed Feb. 24, 2009, which application claims priority to Japanese Pat. App. No. 2008-051676, filed Mar. 3, 2008, both applications of which are incorporated herein by reference in their entireties.

TECHNICAL FIELD

The present invention relates to an imaging device such as a digital still camera, and in particular, relates to an imaging device provided with a function of tracking a subject.

BACKGROUND ART

A function of extracting and tracking a moving object is realized in a system employing a surveillance camera. In this type of system, an alarm is outputted when a moving object (a suspicious person) is detected within a specified area in an image obtained from a surveillance camera. There has also been put into practical use a system furnished with a function of displaying the result of tracking for easy recognition by surveillance staff (see Non-Patent Document 1 listed below).

Image-based tracking processing is achieved, for example, by using the following methods: a pattern matching method in which a tracking pattern is set first and then the pattern is located within images; a method relying on detection of the position of a moving object based on an optical flow; and a method relying on tracking of a characteristic, such as color, of a subject.

Image processing-based technologies for extracting and tracking a moving object, which have originally been studied for the purposes of application in surveillance cameras and realization of robot vision, have recently started to find application in digital cameras for general consumers.

For example, there has been disclosed a method in which a specified subject is tracked and then, when a shutter release button is operated, a still image having a composition in which the subject is positioned in the center is produced by image clipping processing (see Non-Patent Document 2 listed below).

There has also been disclosed a method attempting to prevent a target subject from moving out of a shooting range during a moving-image shooting operation (see Patent Document 1 listed below). With this method, moving vector-based judgment is performed with respect to whether or not there is a possibility of a target subject moving out of a shooting range, and if it is judged that there is such a possibility, a warning is outputted.

Patent Document 1: JP-A-2007-88611

Non Patent Document 1: HAGA Tetsuji, et al., "Intruder Detection and Tracking Camera", [online], August, 2004, Mitsubishi Electric Corporation, [searched on Jan. 25, 2008], Internet<URL:http://www.mitsubishielectric.co.jp/giho/0408/0408111.pdf>

Non Patent Document 2: CASIO, Exilim Full-Line Catalogue, "Auto-Framing Function (right bottom of page 4)", [online], November, 2007,[searched on Jan. 25, 2008], Internet<URL:http://ftp.casio.co.jp/pub/exilim/jp/exilim.pdf>

DISCLOSURE OF THE INVENTION

Problems to be Solved by the Invention

In using this type of tracking function, a user applies a predetermined operation to a digital camera to activate the tracking function. After the operation, the user, basically believing that the tracking function is effectively functioning, performs a shooting operation, hoping to obtain a desired image. However, tracking by image processing is not always successful; various factors cause the ease of tracking to change, often causing a camera to lose track of the tracking target. For example, in a case where tracking is performed based on color information of a tracking target, if the color of the background is similar to that of the tracking target, the ease of tracking may be so low as to cause a camera to lose track of the tracking target. As the ease of tracking lowers, naturally the reliability of tracking lowers.

Conventionally, there is no means provided for informing a user of the reliability or ease of tracking, and thus, even when the user believes that the user has activated the tracking function, the camera may lose sight of the tracking target without the user's knowledge, consequently failing to obtain a desired image.

It often happens that various subjects are included within a shooting range, and it is also important to clearly present the user with information as to which of such various subjects is the subject that the camera is actually tracking.

In view of the foregoing, an object of the present invention is to provide an imaging device provided with a function for easily informing a user of the state of tracking.

Means for Solving the Problem

According to one aspect of the present invention, an imaging device is provided with: an image sensor which outputs a signal indicating a series of images obtained by sequential shooting; a tracking processing portion which, based on the output signal of the image sensor, detects a position of a tracking target on the series of images and thereby tracks the tracking target on the series of images; a tracking evaluation portion which, based on the output signal of the image sensor, evaluates a degree of reliability, or of ease, of tracking by the tracking processing portion, and classifies the degree into one of a plurality of levels; a display portion which displays the series of images; and a display control portion which makes the display portion display an evaluation result by the tracking evaluation portion.

This makes it possible to inform a user of a degree of reliability or ease of tracking. Knowledge of the degree of reliability, or ease, of tracking will make the user recognize that the user needs to set a composition so as to improve the reliability, or ease, of tracking, or needs to operate the camera without relying too much on the tracking processing. This helps prevent occurrence of a situation in which a shooting operation ends without obtaining a desired image.

Specifically, for example, it is preferable that the display control portion make the display portion display: a tracking target icon corresponding to the tracking target; and a level icon indicating the degree which has been evaluated.

Also, for example, it is preferable that the tracking processing portion perform tracking of the tracking target based on color information of the tracking target, the color information being specified by the output signal of the image sensor, and that the tracking target icon have a color corresponding to the color information.

This makes it possible to show to the user, in a manner easy to understand, which subject the imaging device is tracking.

Furthermore, for example, it is preferable that the tracking processing portion perform tracking of the tracking target by first setting a tracking color corresponding to a color which the tracking target has and then tracking, in the series of images, an image region having the tracking color, and that the display control portion set a color that the tracking target icon has before setting of the tracking color to be colorless or to be a color set beforehand.

This makes it possible to inform the user of whether or not the tracking function has started to function in a manner easy for the user to understand.

Also, for example, it is preferable that, in a case in which a plurality of tracking targets are present as the tracking target, the display control portion make the display portion display a plurality of tracking target icons corresponding to the plurality of tracking targets.

And, for example, it is preferable that, in the case in which the plurality of tracking targets are present, when a tracking target which is being actually successfully tracked and a tracking target which is not being actually successfully tracked are included in the plurality of tracking targets, the display control portion use different display styles for a tracking target icon corresponding to the tracking target which is being actually successfully tracked and a tracking target icon corresponding to the tracking target which is not being actually successfully tracked.

This makes it possible to inform the user of a tracking state with respect to each tracking target in a manner easy for the user to understand.

Also, for example, it is preferable that, in the case in which the plurality of tracking targets are present, when a tracking target which is being actually successfully tracked and a tracking target which is not being actually successfully tracked are included in the plurality of tracking targets, the display control portion place a display position of a tracking target icon corresponding to the tracking target which is being successfully tracked closer to the level icon than a display position of a tracking target icon corresponding to the tracking target which is not being successfully tracked.

Also, for example, it is preferable that, in the case in which the plurality of tracking targets are present, the tracking evaluation portion evaluate the degree with respect to each of the plurality of tracking targets, and the display control portion reflect in the level icon a highest degree or a lowest degree, or both the highest and lowest degrees, of the degrees evaluated with respect to the plurality of tracking targets.

Also, for example, it is preferable that, in the case in which the plurality of tracking targets are present, when the plurality of tracking targets are different from each other in level of tracking priority, the display control portion determine display sizes of the tracking target icons according to the level of tracking priority, or the display control portion determine display positions of the tracking target icons according to the level of tracking priority.

Also, for example, it is preferable that the display control portion make the display portion display a tracking target icon corresponding to the tracking target, the degree, which has been evaluated and classified into one of the plurality of levels, being indicated by a color used in the tracking target icon.

Also, for example, it is preferable that the tracking target icon be created by using an image based on the output signal of the image sensor or by using an image registered in advance.

According to another aspect of the present invention, an imaging device is provided with: an image sensor which outputs a signal indicating a series of images obtained by sequential shooting; a tracking processing portion which, based on the output signal of the image sensor, detects a position of a tracking target on the series of images and thereby tracks the tracking target on the series of images; a display portion which displays the series of images; and a display control portion which makes the display portion display a tracking target icon corresponding to the tracking target. Here, the tracking processing portion performs tracking of the tracking target based on color information of the tracking target, the color information being specified by the output signal of the image sensor, and the tracking target icon has a color corresponding to the color information.

This makes it possible to show to a user which subject the imaging device is tracking in a manner easy for the user to understand.

Advantages of the Invention

An object of the present invention is to provide an imaging device provided with a function that allows a user to easily know the state of tracking.

The significance and benefits of the invention will be clear from the following description of its embodiments. It should however be understood that these embodiments are merely examples of how the invention is implemented, and that the meanings of the present invention and the terms used to describe the invention are not limited to the specific ones in which they are used in the description of the embodiments.

BRIEF DESCRIPTION OF DRAWINGS

[FIG. 7] Diagrams, where (a) shows a tracking mode icon displayed in a display portion shown in FIG. 1, (b) shows a tracking target icon forming the tracking mode icon, and (c) shows a level icon forming the tracking mode icon, respectively;

[FIG. 13] Diagrams, where (a), (b) and (c) show what the level icon looks like when an evaluated tracking reliability is high, medium and low, respectively;

[FIG. 14] Diagrams, where (a), (b), and (c) show examples of a display, image when the evaluated tracking reliability is high, middle and low, respectively, and (d) shows an example of the display image when track of a tracking target person is lost;

[FIG. 15] A diagram showing, in connection with a first application example of display, a tracking target icon having a body icon with a plurality of colors as color within itself;

[FIG. 16] Diagrams, in connection with a third application example of display, where (a) shows an example of the display image displayed in a case where there are three tracking target persons, and (b) is an enlarged view showing three tracking target icons included in the display image;

[FIG. 17] Diagrams, in connection with a fourth application example of display, where (a) and (b) show what three tracking target icons look like;

[FIG. 18] Diagrams, in connection with a fifth application example of display, where (a) and (b) show what a tracking mode icon looks like;

[FIG. 19] Diagrams, in connection with a sixth application example of display, where (a) and (b) show what a tracking mode icon looks like;

[FIG. 20] Diagrams, in connection with a seventh application example of display, where (a) and (b) show what a tracking mode icon looks like;

[FIG. 21] Diagrams, in connection with an eighth application example of display, where (a) and (b) show what three tracking target icons look like;

[FIG. 22] A diagram showing, in connection with the eighth application example of display, how a plurality of tracking target icons included in a tracking mode icon are displayed superposed on each other in a back and forth direction;

[FIG. 23] Diagrams, in connection with a ninth application example of display, where (a), (b) and (c) show what a tracking target icon looks like;

[FIG. 24] A diagram showing, in connection with a tenth application example of display, what a tracking mode icon looks like;

[FIG. 27] A diagram showing, in connection with an eleventh application example of display, what a tracking mode icon looks like;

[FIG. 28] A diagram showing, in connection with a twelfth application example of display, a motion amount icon;

[FIG. 29] Diagrams, in connection with the twelfth application example of display, where (a), (b), (c) and (d) show what the motion amount icon looks like when the motion amount of a tracking target person in an image is large, medium, small, and very small, respectively; and

[FIG. 30] A diagram, in connection with the twelfth application example of display, showing how the length of the level icon is changed according to the motion amount of a tracking target person in an image.

| List of Reference Symbols | |
|---|---|
| 1 | imaging device |
| 15 | display portion |
| 33 | image sensor |
| 51 | tracking processing portion |
| 52 | tracking reliability evaluation portion |
| 53 | display control portion |

BEST MODE FOR CARRYING OUT THE INVENTION

Hereinafter, embodiments of the present invention will be specifically described with reference to the drawings. Among different drawings referred to in the course of description, the same portions are identified by the same reference signs, and in principle no overlapping description of the same portions will be repeated.

Figure 1:
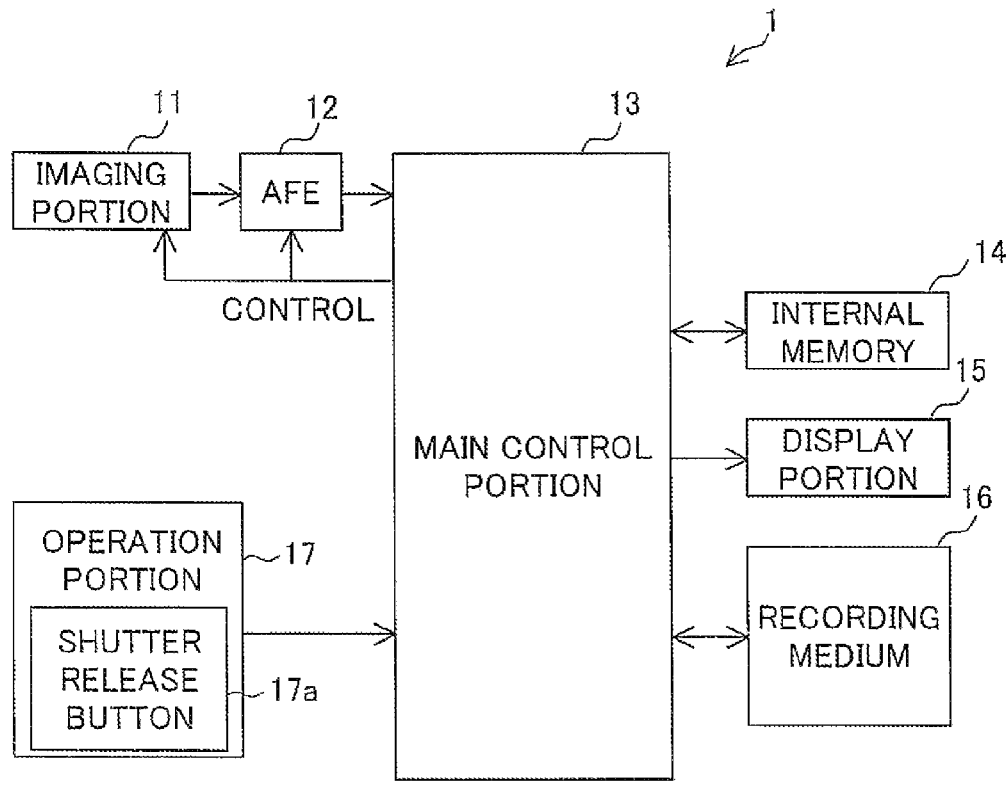
[FIG. 1] An overall block diagram of an imaging device embodying the present invention.

FIG. 1 is an overall block diagram of an imaging device 1 embodying the present invention. The imaging device 1 is a digital still camera capable of shooting and recording still images, or a digital video camera capable of shooting and recording still and moving images.

The imaging device 1 is provided with an imaging portion 11, an AFE (analog front end) 12, a main control portion 13, an internal memory 14, a display portion 15, a recording medium 16, and an operation portion 17. The operation portion 17 includes a shutter release button 17a.

Figure 2:
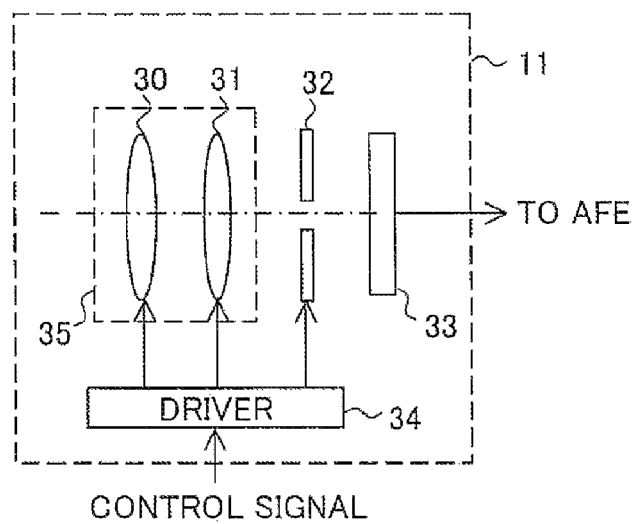
[FIG. 2] A diagram showing the internal structure of an imaging portion of FIG. 1.

FIG. 2 shows the internal structure of the imaging portion 11. The imaging portion 11 includes: an optical system 35; an aperture stop 32; an image sensor 33 constituted of a CCD (charge coupled device), CMOS (complementary metal oxide semiconductor) image sensor or the like; and a driver 34 for driving and controlling the optical system 35 and the aperture stop 32. The optical system 35 is formed with a plurality of lenses including a zoom lens 30 and a focus lens 31. The zoom lens 30 and the focus lens 31 are movable along the optical axis. Based on a control signal from the main control portion 13, the driver 34 drives and controls positions of the zoom lens 30 and the focus lens 31, and the aperture size of the aperture stop 32, to thereby control a focal length (an angle of view) and a focal position of the imaging portion 11, and an amount of light incident on the image sensor 33.

The image sensor 33 performs photoelectric conversion of an optical image representing a subject received through the optical system 35 and the aperture stop 32, and outputs a resulting electrical signal to the AFE 12. More specifically, the image sensor 33 is provided with a plurality of light-receiving pixels arrayed two-dimensionally in a matrix, and, during every period of shooting, each light-receiving pixel accumulates, as a signal charge, an amount of electric charge commensurate with the exposure time. The light-receiving pixels each output an analog signal having a magnitude proportional to the amount of electric charge accumulated as a signal charge there, and these analog signals are sequentially outputted to the AFE 12 in synchronism with drive pulses generated within the imaging device 1. The length of the exposure time is controlled by the main control portion 13.

The AFE 12 amplifies the analog signals outputted from the imaging portion 11 (image sensor 33), and converts the amplified analog signals into digital signals. The AFE 12 outputs those digital signals sequentially to the main control portion 13. The amplification factor of the signal amplification in the AFE 12 is controlled by the main control portion 13.

The main control portion 13 is provided with a CPU (central processing unit), a ROM (read only memory), a RAM (random access memory), etc., and functions as a video signal processing portion. Based on the output signal of the AFE 12, the main control portion 13 generates a video signal representing the image shot by the imaging portion 11. The main control portion 13 also functions as a display control portion for controlling what is displayed on the display portion 15, and controls the display portion 15 as required to achieve display.

The internal memory 14 is formed of SDRAM (synchronous dynamic random-access memory) or the like, and temporarily stores various kinds of data generated within the imaging device 1. The display portion 15 is a display device such as a liquid crystal display panel, and displays a shot image, an image recorded on the recording medium 16, etc. under the control of the main control portion 13. The recording medium 16 is a non-volatile memory such as an SD (secure digital) memory card, and stores a shot image etc. under the control of the main control portion 13.

The operation portion 17 accepts operation from outside. Operation performed on the operation portion 17 is transmitted to the main control portion 13. The shutter release button 17a is a button for requesting shooting and recording of a still image. The shutter release button 17a is pressed to request shooting and recording of a still image.

The shutter release button 17a can be pressed in two steps; that is, when the shooter lightly presses the shutter release button 17a, the shutter release button 17a is brought into a half-pressed state, and when the shooter presses the shutter release button 17a further from the half-pressed state, the shutter release button 17a is brought into a fully-pressed state.

The imaging device 1 operates in different operation modes including a shooting mode, in which a still or moving image can be shot, and a playback mode, in which a still or moving image recorded on the recording medium 16 can be played back on the display portion 15. In the shooting mode, shooting is performed every predetermined frame period, so that the image sensor 33 yields a series of shot images. The individual images forming this series of shot images are each called a "frame image." A series of images (for example, a series of shot images) are a plurality of chronologically ordered images. A series of frame images can be displayed as a moving image on the display screen of the display portion 15.

Figure 3:
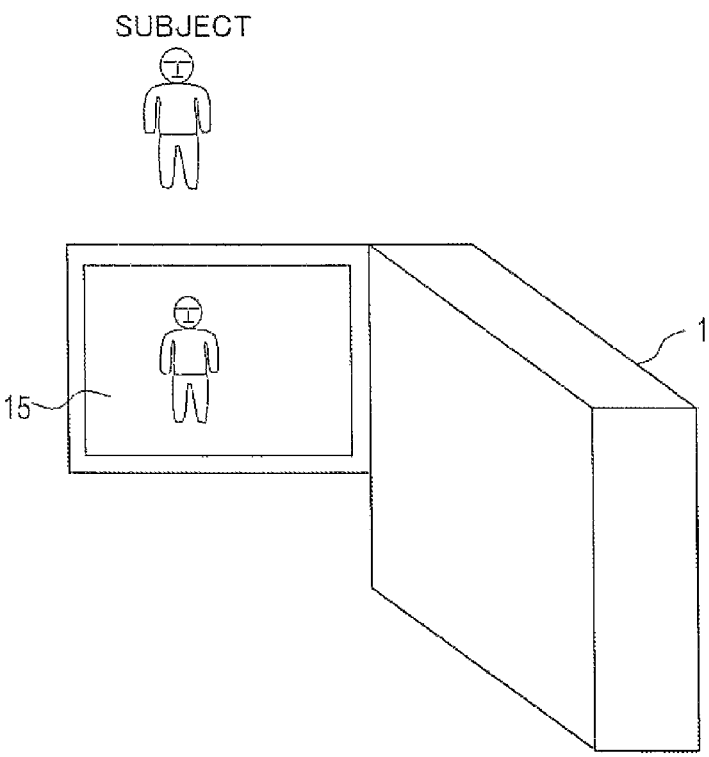
[FIG. 3] A perspective exterior view of the imaging device of FIG. 1.

FIG. 3 is a perspective exterior view of the imaging device 1 as seen from the shooter (photographer). Also shown in FIG. 3 is a person as a subject. The shooter can, by observing how the subject appears on the display screen of the display portion 15, confirm the shooting range of the imaging device 1.

The imaging device 1 is provided with a subject tracking function based on image processing, and performs display in a peculiar manner when the subject tracking function is implemented. The subject tracking function is implemented in the shooting mode. An aspect of the shooting mode in which the subject tracking function is implemented is referred to as a tracking mode. Operating the operation portion 17 in a predetermined manner activates the operation in the tracking mode. Unless otherwise described, the following description deals with how the imaging device 1 operates in the tracking mode. Also, in the following description, what is referred to simply as the "display screen" refers to the display screen of the display portion 15, and what is referred to simply as "display" refers to "display" on the display screen of the display portion 15. The data representing an image is called "image data". The image data of a given frame image is generated from the output signal of the AFE 12 which represents the optical image of that frame image.

Figure 4:
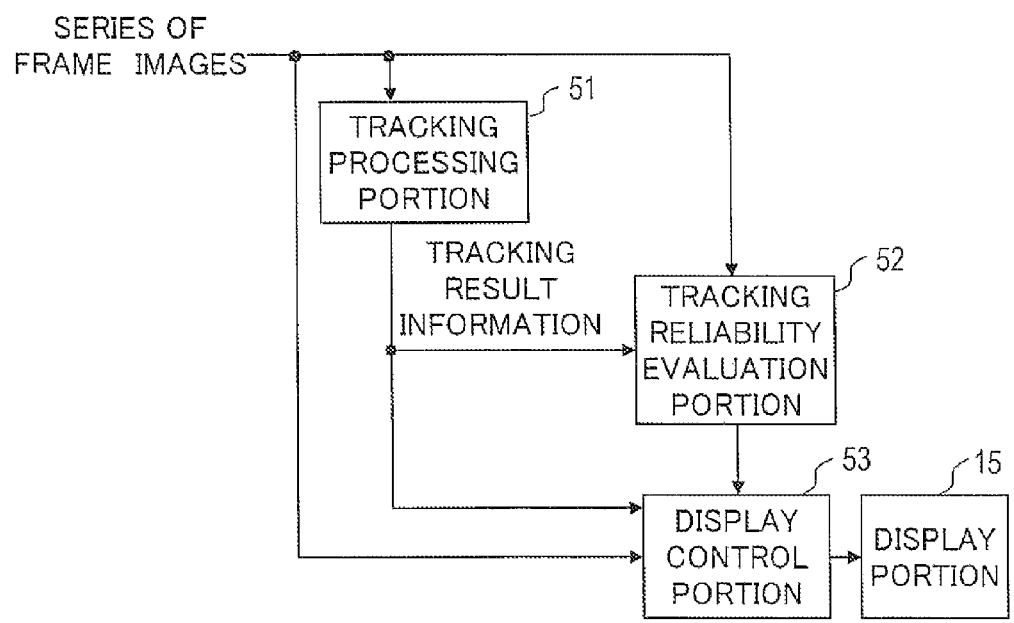
[FIG. 4] A block diagram showing a portion in the imaging device of FIG. 1 particularly related to a subject tracking function.

FIG. 4 is a block diagram showing, among the blocks provided within the imaging device 1, those particularly related to the subject tracking function. A tracking processing portion 51, a tracking reliability evaluation portion 52 and a display control portion 53 are provided within the main control portion 13 of FIG. 1. The image data of the individual frame images forming the series of frame images is sequentially fed to a tracking processing portion 51, to a tracking reliability evaluation portion 52 and the display control portion 53.

Based on the image data of a series of frame images, the tracking processing portion 51 detects the position of a particular subject within one after another of those frame images, and thereby tracks the position of the particular subject on the series of frame images. In this embodiment, it is assumed that the particular subject is a person, and the particular subject to be tracked will accordingly be referred to as "tracking target person" in the following descriptions.

The tracking processing portion 51 is also provided to function as a face detection portion (not shown); based on the image data of a frame image, it detects a face from the frame image, and extracts a face region including the detected face. This is achieved by processing called face detection processing. There have been known a variety of methods for detecting a face included in an image, and the tracking processing portion 51 can adopt any of them. For example, as by the method disclosed in JP-A-2000-105819, it is possible to detect a face (face region) by extracting a skin-colored region from a frame image. Or, it is possible to detect a face (face region) by the method disclosed in JP-A-2006-211139 or JP-A-2006-72770.

Based on the image data of the series of frame images, the tracking reliability evaluation portion 52 evaluates the reliability (the degree of reliability), or the ease (the degree of ease), of the tracking by the tracking processing portion 51. The reliability of tracking and the ease of tracking have similar, or analogous, significances. Strictly speaking, the reliability of tracking is construed to indicate how reliable the tracking executed in the past was, and the ease of tracking is construed to indicate how easy the tracking to be executed will be. The higher the ease of tracking, the higher the reliability of tracking; the lower the ease of tracking, the lower the reliability of tracking. In the following descriptions, for the sake of convenience of description; it is assumed that "the tracking processing portion 51 evaluates the reliability of tracking," but the reliability of tracking can be read as the ease of tracking.

The display control portion 53 controls what is displayed on the display portion 15, generates image data of a display image from image data of a frame image, and sends the image data of the display image to the display portion 15, to thereby make the display portion 15 display the display image on the display screen. Frame images are periodically obtained one after another, and accordingly, display images are also periodically generated to be displayed on the display screen in a constantly updated manner. The display image is generated by reflecting, in the frame image, the result of tracking performed by the tracking processing portion 51 and the result of evaluation performed by the tracking reliability evaluation portion 52. Incidentally, since a display image is displayed on the display screen, the following description will deal with the display image and the display screen as equivalents. Also, in a display image and the display screen, the horizontal direction will be regarded as the left-right direction, and the vertical direction will be regarded as the up-down direction.

Figure 5:
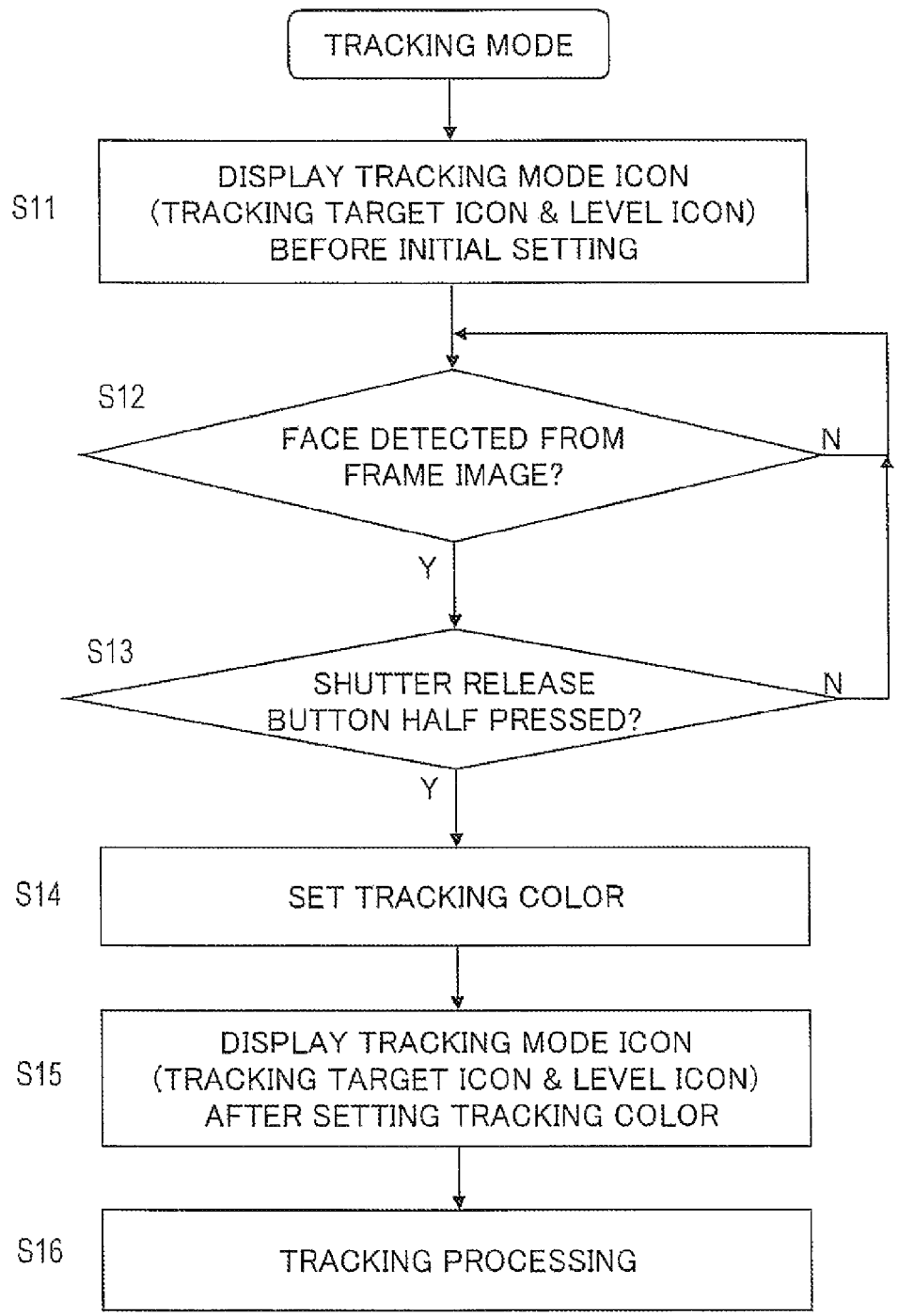
[FIG. 5] A flow chart showing the operation flow in the tracking mode of the imaging device of FIG. 1.

A detailed description will be given of the operation in the tracking mode, with reference to FIG. 5. FIG. 5 is a flow chart showing the operation flow in the tracking mode of the imaging device 1. First, when the operation mode of the imaging device 1 is set to the tracking mode, in step S11, the display control portion 53 makes a tracking mode icon before initial setting be displayed superposed on a current frame image.

Figure 6:
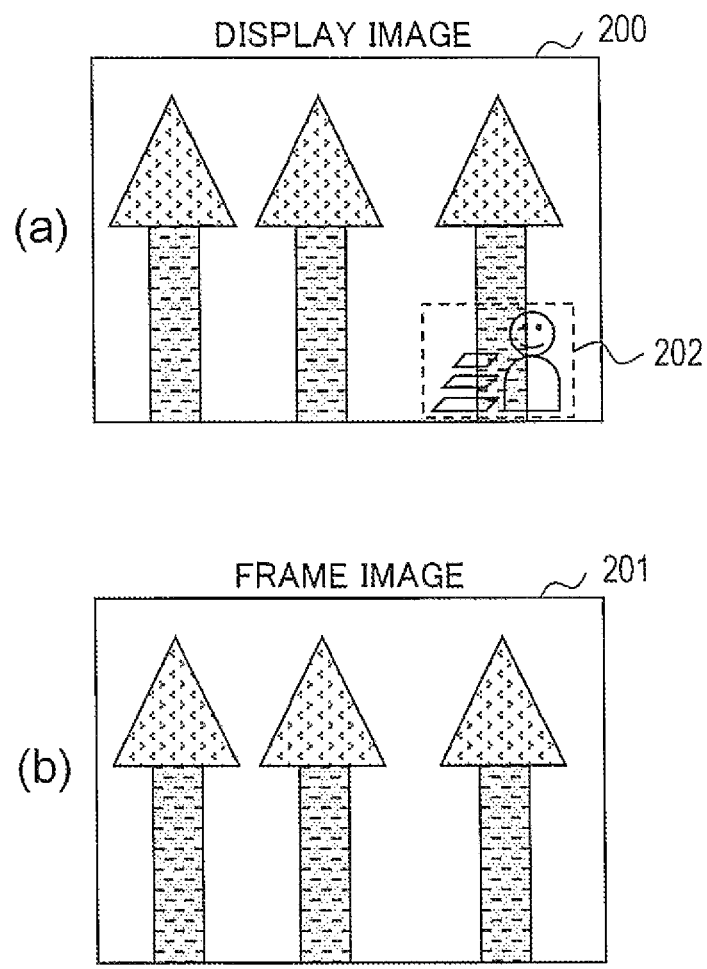
[FIG. 6] Diagrams, where (a) shows an example of a display image displayed in the tracking mode, and (b) shows a frame image based on which the display image is formed.

A display image 200 displayed in step S11 is shown in FIG. 6(a), and a frame image 201 from which the display image 200 is generated is shown in FIG. 6(b). The icon in a broken-line rectangular region 202 located in the bottom right portion of the display image 200 is a tracking mode icon before initial setting. A tracking mode icon before initial setting blinks on the display screen (note that the blinking is not indispensable). The state in which a tracking mode icon before initial setting is displayed continues until immediately before step S15.

The tracking mode icon before initial setting and a later-described tracking mode icon after setting a tracking color will be collectively referred to simply as a tracking mode icon. An enlarged view of the tracking Mode icon is shown in FIG. 7(a). The tracking mode icon is formed of a tracking target icon and a level icon which are arranged side by side in the left-right direction. The figure shown in a broken-line rectangle 210 is the tracking target icon, and the pattern shown in a broken-line rectangle 220 is the level icon.

As shown in FIG. 7(b), a tracking target icon is formed of a face icon and a body icon that are arranged the one on the other along the up-down direction. The figure shown in the broken-line, rectangle 211 represents the face icon, and the figure shown in a broken-line rectangle 212 represents the body icon. The face icon is formed as an image symbolizing a human face, and the body icon is formed as an image symbolizing a human body. Incidentally, the broken lines in FIGS. 7(a) and 7(b) are shown for the sake of convenience of description, and thus, the broken lines are not components of the tracking mode icon (that is, the broken lines are not displayed).

As shown in FIG. 7(c), the level icon is formed of first to third bar icons denoted by reference numerals 221 to 223, respectively. The first to third bar icons are displayed such that they are arranged one on another in the up-down direction. The first to third bar icons are each an image of a figure having a shape of a parallelogram, and they are designed to symbolically represent the motion of a tracking target.

The body icon has a substantially quadrangular contour, and the color within the body icon is changed according to the state of tracking. The color within the body icon is set to be colorless (that is, transparent) in the tracking mode icon before initial setting. Thus, as shown in FIG. 6(a), a corresponding portion of the frame image is displayed within the body icon in the display image 200. As already mentioned, the bar icons each have a parallelogram contour, and the color within the parallelogram is also changed according to the state of tracking. The color within each bar icon is colorless in the tracking mode icon before initial setting. The color within the body icon and/or the color within each bar icon in the tracking mode icon before initial setting can be set to be a color set beforehand (e.g., a translucent color), instead of being colorless. In FIG. 6(a), the color within the face icon is also colorless, but the color within the face icon may be set freely.

After the operation mode is set to the tracking mode, the tracking processing portion 51 shown in FIG. 4 performs the face detection processing with respect to the frame images that are inputted one after another. Then, in steps S12 and S13 following step S11 in FIG. 5, the tracking processing portion 51 confirms whether or not a face has been detected in the current frame image, and if it finds that a face has been detected and that the shutter release button 17a is in a half-pressed state, the process proceeds to step S14. As seen from a user's viewpoint, the following operation is performed. When the user sets the tracking mode and then half-presses the shutter release button 17a, pointing the imaging device 1 to a person, the person's face is automatically detected, and the process proceeds to step S14. In this embodiment, half-pressing operation with respect to the shutter release button 17a is a condition for the process to proceed to step S14, but the condition may be replaced by any other condition. For example, the process may proceed from step S13 to step S14 when a predetermined operation is performed with respect to the operation portion 17.

Figure 8:
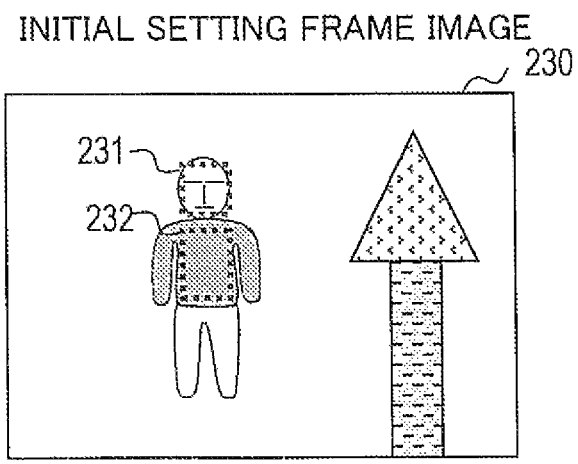
[FIG. 8] A diagram showing how a face region and a body region of a person are extracted from an initial setting frame image.

In step S14, the tracking processing portion 51 takes, as an initial setting frame image, the frame image that is obtained immediately before the process reaches step S14, and from which a face has been detected; based on the image data of the initial setting frame image, the tracking processing portion 51 then sets a tracking color. A method of setting a tracking color will now be described with reference to FIG. 8. FIG. 8 shows an image 230 as an example of the initial setting frame image. In FIG. 8, a broken-line rectangular region 231 is a face region extracted from the initial setting frame image 230 by the face detection processing. After the face region 231 is extracted, the tracking processing portion 51 detects a body region 232 as a region including the body part of the person corresponding to the face region 231. The body region 232 is illustrated as a rectangular region located under the face region 231 (in the direction pointing from the middle of the forehead to the mouth). The position and the size of the body region 232 in the initial setting frame image are determined depending on the position and the size of the face region 231.

Thereafter, based on the image data of the image within the body region 232, the tracking processing portion 51 identifies a color within the body region 232, and sets the identified color as the tracking color. For example, based on the color signals (for example, RGB signals) of the pixels forming the image within the body region 232, a color histogram of the image within the body region 232 is created. Then, based on the color histogram, the dominant color or most frequent color in the image within the body region 232 is found, and the thus found color is set as a tracking color. The dominant color of a given image is the color that occupies the largest part of the image region of that image, and the most frequent color of a given image is the color of the highest frequency in the color histogram of that image (the dominant color can be equivalent to the most frequent color). Alternatively, the color signals (for example, RGB signals) of the pixels forming the image within the body region 232 are averaged to find the average color of the image within the body region 232, and this average color may be set as the tracking color.

Figure 9:
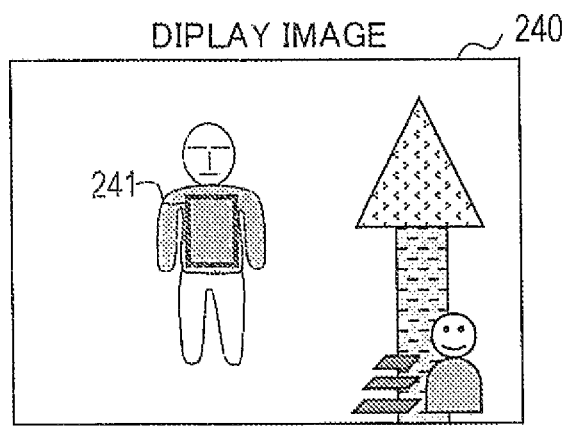
[FIG. 9] A diagram showing an example of a display image displayed during tracking processing.

After the tracking color is set, the process proceeds to step S15 in FIG. 5. In step S15, the display control portion 53 makes the tracking mode icon after the setting of the tracking color be displayed such that it is superposed on the current frame image. The display of the tracking mode icon after the setting of the tracking color is performed in step S15 and in step S16 that follows step S15. The image shown in FIG. 9 is an example of the display image displayed here. In the bottom right portion of a display image 240 in FIG. 9, the tracking mode icon after the setting of the tracking color is superposed on the current frame image. The color within the body icon in the tracking mode icon after the setting of the tracking color is set to be the same as (or similar to) the tracking color. The color within each bar icon in the tracking mode icon after the setting of the tracking color is determined according to the reliability of the tracking. This will be described later. Also, as shown in FIG. 9, a frame 241 that encloses part, or all, of the body region of the tracking target person is displayed in a superposed fashion. However, it is possible to delete the display of the frame 241 according to an instruction from the user.

In step S16, the tracking processing portion 51 performs tracking processing with respect to the series of frame images obtained after the processing performed in step S15. Individual frame images forming the series of frame images to be subjected to the tracking processing are each called a tracking target frame image. Based on the image data of the series of tracking target frame images, the tracking processing portion 51 detects positions of the tracking target person in the individual tracking target frame images.

The tracking processing portion 51 performs the tracking processing based on the color information of the tracking target person. Usable as methods for tracking processing based on color information are those disclosed in JP-A-H5-284411, JP-A-2000-48211, JP-A-2001-169169, etc. In the example under discussion, the color information of the tracking target person is expressed by the tracking color set as described above. Thus, according to the color signals of the tracking target frame image, the tracking processing portion 51 extracts, from tracking target frame image, a region of a color closely similar to the tracking color. The thus extracted region is regarded as a body region of the tracking target person within the tracking target frame image.

Specifically, for example, within a tracking target frame image of interest, a tracking frame having a size about that of the body region of the tracking target person is set; while the tracking frame is moved from one position to another within the search range, at each position, similarity between the color of the image within the tracking frame and the tracking color is evaluated, and the position of the tracking frame where the closest similarity is obtained is judged to be where the body region of the tracking target person is located. The search range for the current tracking target frame image is set based on the position of the tracking target person in the previous tracking target frame image.

The tracking processing portion 51 executes the above-described tracking processing based on color information on one tracking target frame image after another fed thereto, and thereby detects the position of the tracking target person in each tracking target frame image. For example, the position of the tracking target person is expressed by the center coordinates of the body region of the tracking target person.

The size of the tracking target person as it appears on the tracking target frame image varies with, for example, variation in the distance (the distance in the real space) between the tracking target person and the imaging device 1. This requires that the size of the above-mentioned tracking frame be altered appropriately in accordance with the size of the tracking target person as it appears on the tracking target frame image. This alteration is realized by a subject size detection method used in a known tracking algorithm. For example, in a tracking target frame image, it is assumed that the background appears at a point sufficiently apart from a point where the body of the tracking target person is expected to be located, and, based on the image characteristics between those two points, the tracking processing portion 51 classifies the pixels located between the two points into either those belonging to the background or those belonging to the tracking target person. Through this classification, the contour of the tracking target person is estimated. Then, from the contour, the size of the tracking target person is estimated, and in accordance with the thus estimated size, the size of the tracking frame is set.

Setting the size of the target frame is equivalent to detecting the size of the body region of the tracking target person in a tracking target frame image. Moreover, since the size of a tracking target person is proportional to the size of the body region, when the size of the body region is detected, simultaneously the size of the tracking target person is identified. Thus, the tracking processing portion 51 detects the position and the size of the tracking target person in each tracking target frame image. Tracking result information including information representing the detected position and size is transmitted to the tracking reliability evaluation portion 52 and the display control portion 53 (see FIG. 4). A frame 241 in FIG. 9 is a frame that encloses part, or all, of a body region detected from a tracking target frame image on which a display image 240 is based, and the display control portion 53 generates the frame 241 based on the tracking result information.

[Evaluation and Display of Reliability of Tracking]

Figure 10:
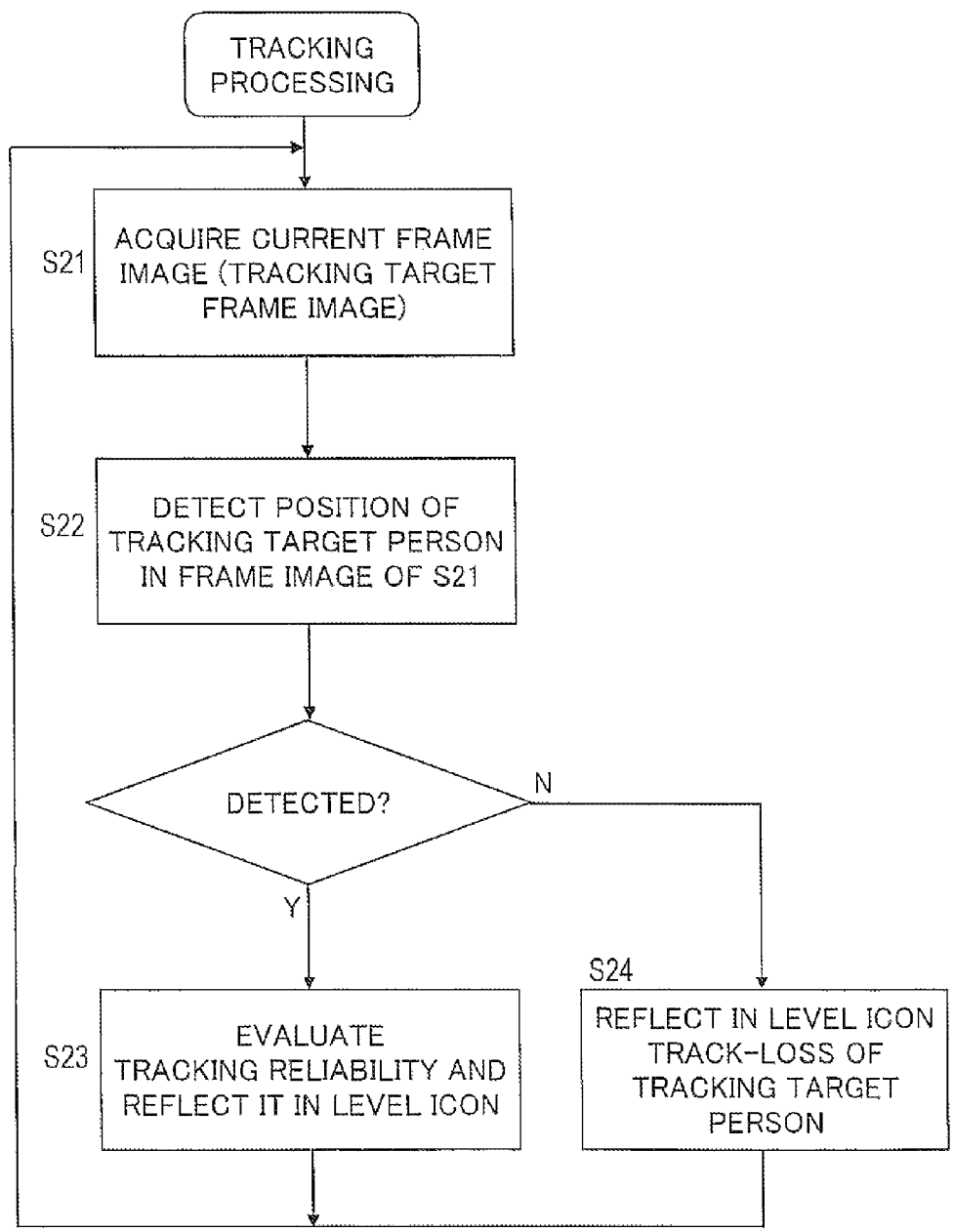
[FIG. 10] A detailed flow chart of the tracking processing performed in step S16 of FIG. 5.

Next, with reference to FIG. 10, descriptions will be given of methods of evaluating and displaying the reliability of tracking. FIG. 10 is equivalent to a detailed flow chart of the tracking processing performed in step S16 in FIG. 5. In this example, the processing performed in step S16 is composed of steps S21 to S24.

In step S21, a current frame image is acquired from the output signal of the AFE 12 which corresponds to one frame image at the moment. The frame image acquired here is, as described above, a tracking target frame image. Subsequently, in step S22, the tracking processing portion 51, through the tracking processing described above, detects the position and size of the tracking target person in the current frame image acquired in step S21. However, this position is not always detected. For example, if the background color and the tracking color are the same, this position fails to be detected. Needless to say, if the tracking target person moves out of the shooting range, this position cannot be detected, either. If the position of a tracking target person is successfully detected in step S22, the processing of step S23 is performed, and if not, the processing of step S24 is performed.

In step S23, the tracking reliability evaluation portion 52 in FIG. 4 evaluates the reliability of the tracking performed with respect to the frame image in step S22, that is, how much the position of the tracking target person detected from the frame image of step S22 is reliable. This evaluation is performed based on the background color and the tracking color.

The evaluation here is performed, for example, by the following method. The evaluated reliability is represented by an evaluation value called a reliability evaluation value and denoted by $EV_R$. A reliability evaluation value can be calculated for each tracking target frame image. $EV_R$ takes a value of zero or more but 100 or less, and the higher the reliability of tracking is evaluated, the greater the reliability evaluation value $EV_R$ is.

Figure 11:
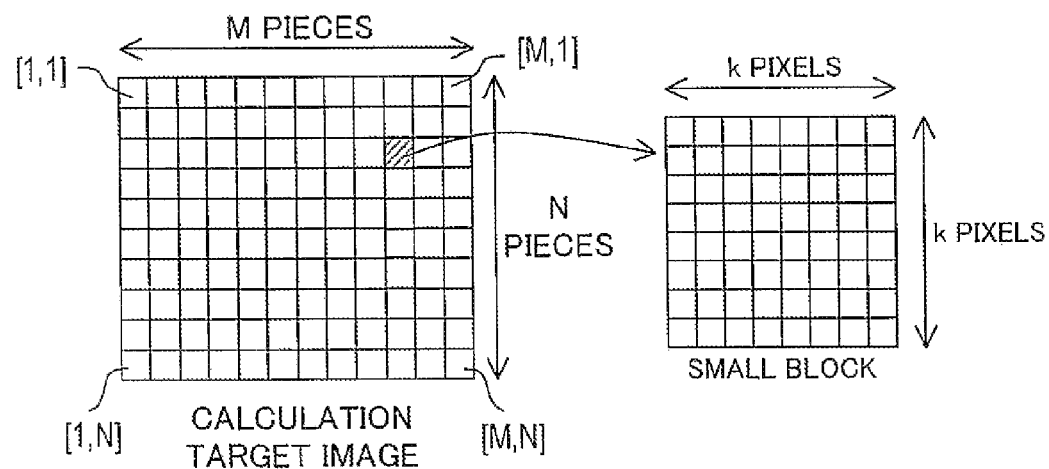
[FIG. 11] A diagram showing how an calculation target image as a tracking target frame image is divided into a plurality of small blocks.

The tracking reliability evaluation portion 52 handles the tracking target frame image obtained in step S22 as an calculation target image. And, as shown in FIG. 11, the tracking reliability evaluation portion 52 sets a plurality of small blocks in the calculation target image by dividing the entire region of the calculation target image in horizontal and vertical directions into a plurality of blocks. Suppose now that the number of division in the horizontal and vertical directions are M and N respectively (where M and N are each an integer of 2 or more). Each small block is formed of (k×k) pixels (where k is an integer 2 or larger, and for example, k=32). As signs indicating the horizontal position and the vertical position of a small block in the calculation target image, m and n are introduced (where m is an integer satisfying $1 \leq m \leq M$, and n is an integer satisfying $1 \leq n \leq N$), respectively. Here, a larger m indicates a horizontal position closer to the right side, and a larger n indicates a vertical position closer to the bottom. A small block whose horizontal position is m and whose vertical position is n is represented as a small block [m, n].

Figure 12:
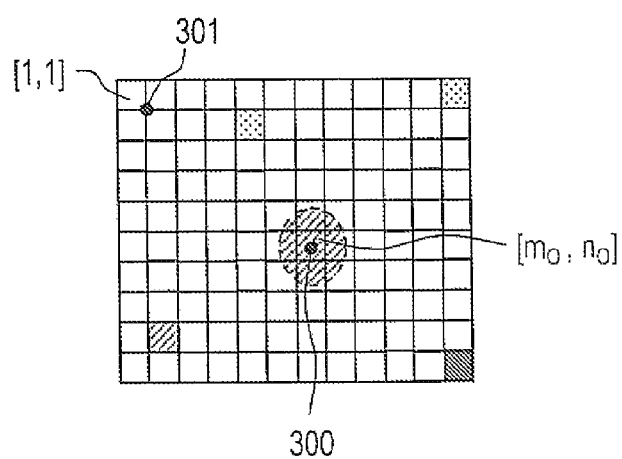
[FIG. 12] A diagram for illustrating how the tracking reliability evaluation portion of FIG. 4 evaluates the reliability of tracking, the diagram showing a center of a tracking target person, etc. superposed on an calculation target image as a tracking target frame image.

Based on the tracking result information, the tracking reliability evaluation portion 52 recognizes the center of the body region of the tracking target person in the calculation target image, and identifies the small block to which the position of that center belongs. In FIG. 12, the center is represented by a point 300. Now, suppose that the center 300 belongs to a small block $[m_o, n_o]$ (where $m_o$ is an integer value satisfying $1 \leq m \leq M$, and $n_o$ is an integer value satisfying $1 \leq n \leq N$). Moreover, by the subject size detection method mentioned above, the small blocks are classified into either those where the image data of the tracking target appears or those where the image data of the background appears. The former small blocks are called subject blocks and the latter small blocks are called background blocks. FIG. 12 conceptually shows that the color of the tracking target person appearing around the center 300 differs from the color of the background.

For each background block, the tracking reliability evaluation portion 52 calculates a color difference evaluation value representing the difference between the color of the image within the background block and the set tracking color. Suppose that there are Q of the background blocks, and the color difference evaluation values calculated for the first to Qth background blocks are denoted by $C_{DIS}[1]$ to $C_{DIS}[Q]$, respectively (where Q is an integer satisfying $2 \leq Q \leq (M \times N) - 1$). For example, to calculate the color difference evaluation value $C_{DIS}[1]$, the color signals (for example, RGB signals) of the pixels belonging to the first background block are averaged, thereby the average color of the image within the first background block is found, and then the position of the average color in the RGB color space is detected. On the other hand, the position, in the RGB color space, of the tracking color set for the tracking target person is also detected, and the distance between the two positions in the RGB color space is calculated as the color difference evaluation value $C_{DIS}[1]$. Thus, the greater the difference between the colors compared, the greater the color difference evaluation value $C_{DIS}[1]$. Here, it is assumed that the RGB color space is normalized such that the color difference evaluation value $C_{DIS}[1]$ takes a value in the range of 0 or more but 1 or less. The other color difference evaluation values $C_{DIS}[2]$ to $C_{DIS}[Q]$ are calculated in the same manner. The color difference evaluation values may be obtained based on color space other than the RGB color space (for example, the HSV color space).

Furthermore, for each background block, the tracking reliability evaluation portion 52 calculates a position difference evaluation value representing the spatial difference between the positions of the center 300 and of the background block on the calculation target image. The position difference evaluation values calculated for the first to Qth background blocks are denoted by $P_{DIS}[1]$ to $P_{DIS}[Q]$, respectively. With respect to a given background block, the position difference evaluation value is given as the distance between the center 300 and, of the four vertices of that background block, the one closest to the center 300. Suppose that the small block [1, 1] is the first background block, with $1 < m_o$ and $1 < n_o$, and that, as shown in FIG. 12, of the four vertices of the small block [1, 1], the vertex 301 is closest to the center 300; then the position difference evaluation value $P_{DIS}[1]$ is given as the spatial distance between the center 300 and the vertex 3011 on the calculation target image. Here, it is assumed that the space region of the calculation target image is normalized such that the position difference evaluation value $P_{DIS}[1]$ takes a value in the range of 0 or more but 1 or less. The other position difference evaluation values $P_{DIS}[2]$ to $P_{DIS}[Q]$ are calculated in the same manner.

Based on the color difference evaluation values and the position difference evaluation values found as described above, the tracking reliability evaluation portion 52 calculates, according to formula (1) below, an integrated distance $CP_{DIS}$ for the calculation target image of interest. It then calculates, according to formula (2) below, by using the integrated distance $CP_{DIS}$, a reliability evaluation value $EV_R$ for the calculation target image of interest. Specifically, when "$CP_{DIS} > 100$," then "$EV_R = 0$"; when "$CP_{DIS} \leq 100$," then "$EV_R = 100 - CP_{DIS}$." As will be understood from this calculation method, when a background of the same color as, or a similar color to, the tracking color is present near the tracking target person, the reliability evaluation value $EV_R$ is low.

[Formula 1]

$$CP_{Dis} = \sum_{i=1}^{Q} \sqrt{(1 - C_{DIS}(i)) \times (1 - P_{DIS}(i))} \qquad (1)$$

[Formula 2]

$$EV_R = \begin{cases} 0 & (\text{if } CP_{DIS} > 100) \\ 100 - CP_{DIS} & (\text{if } CP_{DIS} \leq 100) \end{cases} \qquad (2)$$

In step S23 in FIG. 10, based on the reliability evaluation value $EV_R$ calculated for the current frame image (the latest frame image), the display control portion 53 determines the color of the level icon to be superposed on the current frame image. Then, a tracking mode icon including the level icon having the determined color is superposed on the current frame image, to thereby generate and display a display image.

FIGS. 13(a) to 13(c) show level icons to be superposed on the frame images in step S23. In this example, reliability evaluation values $EV_R$ are classified into three levels. If the inequality expression "$EV_R \geq TH_1$" is satisfied, the reliability of tracking is judged to be high, and as shown in FIG. 13(a), the colors within the first to third bar icons forming the level icon to be superposed are set to be a specified color. The specified color used for the bar icons is any color (for example, red), except colorlessness (transparency), which is set beforehand. If the inequality expression "$TH_1 > EV_R \geq TH_2$" is satisfied, the reliability of tracking is judged to be medium, and as shown in FIG. 13(b), the colors within the first and second bar icons forming the level icon to be superposed are set to be the specified color, while the color within the third bar icon is set to be colorless. If the inequality expression "$TH_2 > EV_R$" is satisfied, the reliability of tracking is judged to be low, and as shown in FIG. 13(c), the color within the first bar icon forming the level icon to be superposed is set to be the specified color, while the colors within the second and third bar icons are set to be colorless. Here, $TH_1$ and $TH_2$ are predetermined threshold values that satisfy the inequality expression "$100 > TH_1 > TH_2 > 0$".

On the other hand, in step S24, to which the process proceeds when the position of the tracking target person fails to be detected, loss of track of the tracking target person is reflected in the level icon. Specifically, in step S24, the display control portion 53 generates and displays a display image by superposing on the current frame image a tracking mode icon in which colors within the first to third bar icons are colorless.

After the display in step S23 or S24, the process returns to step S21, and the processing composed of steps S21 to S24 is repeated.

FIGS. 14(a) to 14(d) each show what the display screen looks like during the performance of the tracking processing. FIGS. 14(a), 14(b) and 14(c) show what the display screen looks like when the reliability of tracking is high, medium and low, respectively, and FIG. 14(d) shows what the display screen looks like when the tracking target person is lost track of.

If the shutter release button 17a is fully pressed during the tracking processing, a still image is shot, with attention paid to the tracking target person, and the image data of the shot still image is recorded in the recording medium 16. For example, after the position of the image sensor 33 is driven and controlled such that, for example, the tracking target person is positioned in the center of the imaging surface of the image sensor 33, an output signal of the image sensor 33 is taken in, to thereby obtain a still image having the tracking target person positioned in the center thereof. Alternatively, image trimming may be performed to obtain a still image having the tracking target person positioned in the center thereof.

When the tracking target person is likely to move out of the shooting range (that is, so-called frame out is likely to happen), a warning to that effect may be displayed.

There have been developed imaging devices provided with a function of tracking a person, but there has been no means provided to inform a user of the reliability of tracking. Thus, even when the user believes that the user has implemented the tracking function, the camera may lose track of a tracking target without the user's knowledge, consequently resulting in a failure of obtaining a desired image. In this embodiment, as hitherto described, the reliability of tracking is evaluated and classified into a plurality of levels, and the evaluation result is displayed. This makes it possible to inform a user of the reliability of the tracking. Knowledge of the reliability of tracking will lead the user to recognize that the user needs to set a composition so as to improve the reliability, or to operate the camera without relying too much on the tracking processing. This helps prevent occurrence of a situation in which a shooting operation ends without obtaining a desired image. Also, as shown in FIGS. 7(a) to 7(c), by including, in the tracking mode icon, the tracking target icon symbolizing a person and the level icon which has a design that conceptually represents the motion of a tracking target, it is possible to help the user intuitively understand that the icon is related to the tracking of a person.

Also, during the tracking processing, with the tracking color as the color within the body icon, it is possible to show the user which subject the imaging device 1 is tracking in an easy-to-understand manner. On the other hand, before initial setting for the tracking processing is performed, the color within the body icon is colorless. This makes it possible to let the user clearly know whether or not the tracking function has started to operate.

Display examples in various cases will be described below as first to twelfth application examples of display. The following application examples of display are each based on the structure and operation described above, and what has been hitherto described is applied to each of the application examples of display unless inconsistent. Furthermore, unless inconsistent, a feature of any of the application examples of display is applicable in combination with a feature of any of the other application examples of display.

[First Application Example of Display]

The color within the body icon may include a plurality of colors when the clothes of a tracking target person are not single-colored but include a plurality of colors.

A case will be considered, as an example, in which the top wear of the tracking target person is dyed red and blue, the upper half of the top wear being red and the lower half of the top wear being blue. In this case, the tracking processing portion 51 sets red and blue as the tracking colors based on image data of a frame image including the tracking target person. After the setting, the display control portion 53 makes a body icon be displayed, the body icon having, as shown in FIG. 15, red and blue as colors within itself.

Tracking is performed by setting a tracking frame for searching for an image region having red and a tracking frame for searching for an image region having blue in a tracking target frame image, and detecting the position of the tracking target person based on the search result of the two image regions. Alternatively, the position of the tracking target person may be detected by searching within the tracking target frame image for an image region including red and blue, considering the image region including red and the image region including blue as one set.

Furthermore, alternatively, different levels of search priority may be given to red and blue. In this case, when, for example, a higher level of priority is given to red, a tracking frame is first set in the tracking target frame image for searching for an image region having red, and based on the search result of the image region, the position of the tracking target person is detected. If the search is not successful, a tracking frame is set in the tracking target frame image for searching for an image region having blue, and the position of the tracking target person is detected based on the search result of the image region.

[Second Application Example of Display]

A high priority color can be set according to an instruction that the user inputs by operating the operation portion 17. For example, when red is set as the high priority color, the tracking processing portion 51 preferentially sets red as the tracking color, and searches the tracking target frame image to find an image region including red, and tracks the image region.

A more specific explanation will be given with respect to an assumed situation of use. Now, suppose that a person wearing red clothes and a person wearing blue clothes are present in the shooting range, and the shooter gives a high level of priority to the former. In this case, the shooter sets the operation mode of the imaging device 1 to the tracking mode, and further sets the color red as the priority color. Then, in step S11 of FIG. 5, the tracking mode icon including the body icon is displayed such that the color within the body icon is red. First and second face regions are extracted from an initial setting frame image, and the tracking processing portion 51 recognizes a person corresponding to a red body region as the tracking target person based on the setting with respect to the priority color. That is, for example, if it is judged that the color of the body region corresponding to the first face region is red or a color close to red, and that the color of the body region corresponding to the second face region is blue or a color close to blue, based on the image data of the initial setting frame image, the person corresponding to the first face region is set as the tracking target person, and the color of the body region corresponding to the first face region is set as the tracking color. Thereafter, the tracking operation is performed as described above.

[Third Application Example of Display]

When two or more persons are present in the shooting range, the persons can be tracked as the tracking target persons, and as many tracking target icons can be displayed.

A specific example will be given on the assumption that first to third persons are included in the shooting range. In this case, the tracking processing portion 51 extracts first to third face regions corresponding to the first to third persons from the initial setting frame image. Then, if it is confirmed that the shutter release button 17a is half-pressed, the process proceeds to step S14, where the tracking processing portion 51 extracts, from the first setting frame image, first to third body regions corresponding to the first to third face regions, identifies colors within the body regions based on image data of the images within the body regions, and sets the colors thus identified with respect to the first to third body regions as first to third tracking colors, respectively. Then, handling the first to third persons as first to third tracking target persons, the tracking processing portion 51 individually tracks each tracking target person by individually detecting the position of each tracking target person in the series of tracking target frame images.

The specific example dealt with here is called "more than one person specific example α." In the "more than one person specific example α," first to third persons are included in the shooting range. In the "more than one person specific example α," corresponding to the first to third persons, first to third face regions and first to third body regions are extracted, along with which first to third tracking colors are set; and the first to third persons are handled as first to third tracking target persons to be individually tracked. In connection with the third to eighth application examples of display, descriptions will be made on operations and display methods under the assumption of the "more than one person specific example α."

FIG. 16(a) shows a display image 400 that can be generated from a given tracking target frame image. In a right bottom part of the display image 400, there is illustrated a tracking mode icon formed of first to third tracking target icons and one level icon, the tracking target icons and the level icon being arranged side by side so as not to overlap each other. FIG. 16(b) is an enlarged view of the first to third tracking target icons in the display image 400. The first to third tracking target icons are arranged side by side in the left-right direction so as not to overlap each other, and colors within the body icons of the first to third tracking target icons are the first to third tracking colors, respectively.

[Fourth Application Example of Display]

To execute the tracking processing, the tracking processing portion 51 tries to individually detect the positions of the first to third tracking target persons on the tracking target frame image. However, due to similarity between a background color and a tracking color, occlusion by an obstruction or the like, a situation may arise in which the position of a tracking target person can be detected but the position of another tracking target person cannot be detected. The former tracking target person is called an actually tracked person meaning a tracking target person that is being actually successfully tracked. The latter tracking target person is called a tracking lost person meaning a tracking target person that is not being actually successfully tracked.

If both actually tracked and tracking lost persons are included in the first to third tracking target persons, different display styles may be used for a tracking target icon corresponding to the actually tracked person and a tracking target icon corresponding to the tracking lost person. This makes it possible to let the user know easily, with respect to each tracking target person, whether or not the tracking is being successfully performed.

For example, only the tracking target icon corresponding to the actually tracked person may be highlighted. More specifically, for example, as shown in FIGS. 17(a) and (b), the contour of the tracking target icon for the actually tracked person is drawn with a comparatively thick line, while the contour of the tracking target icon for the tracking lost person is drawn with a comparatively thin line. FIG. 17(a) corresponds to a case in which the first and second persons are actually tracked persons and the third person is a tracking lost person, while FIG. 17(b) corresponds to a case in which the first and third persons are actually tracked persons and the second person is a tracking lost person. Incidentally, in a case in which all the first to third persons are actually tracked persons, the contours of the first to third tracking target icons are drawn with comparatively thick lines.

A variety of modifications are possible to realize different display styles, and, for example, such different display styles may be achieved by varying factors such as presence or absence of a blinking function, display size and display color. That is, for example, the tracking target icon corresponding to a tracking lost person may be displayed in a blinking fashion, while the tracking target icon corresponding to an actually tracked person is displayed steadily on the display screen. Alternatively, for example, the display size of the tracking target icon corresponding to an actually tracked person may be larger than that of the tracking target icon corresponding to a tracking lost person.

[Fifth Application Example of Display]

As shown in FIG. 16(a), in a case of displaying the tracking mode icon that is formed of the first to third tracking target icons for the first to third tracking target persons and a level icon; and in which the tracking target icons and the level icon are arranged side by side in the left-right direction so as not to overlap each other, if actually tracked and tracking lost persons are included in the first to third tracking target persons, the tracking target icon for an actually tracked person may be displayed closer to the level icon than the tracking target icon for a tracking lost person.

That is, for example, when the first and second persons are actually tracked persons, and the third person is a tracking lost person, as shown in FIG. 18(a), the level icon, the tracking target icon for the first person, the tracking target icon for the second person, and the tracking target icon for the third person are displayed side by side in this order from left to right on the display screen. Thereafter, if the first and second persons change to tracking lost persons and the third person changes to an actually tracked person, as shown in FIG. 18(b), the level icon, the tracking target icon for the third person, the tracking target icon for the first person, and the tracking target icon for the second person are displayed side by side in this order from left to right on the display screen.

[Sixth Application Example of Display]

Furthermore, in a case in which a plurality of actually tracked persons are present, the tracking reliability evaluation portion 52 calculates the reliability evaluation value for each of the plurality of actually tracked persons, to thereby evaluate the reliability of tracking with respect to each actually tracked person. The display control portion 53 identifies the greatest of the reliability evaluation values calculated with respect to the actually tracked persons, and places the tracking target icon for the actually tracked person corresponding to the greatest reliability evaluation value closest to the level icon, and makes the greatest reliability evaluation value be reflected in the level icon.

A more specific description will be given under the assumption that, as shown in FIG. 16(a), the tracking mode icon displayed is formed of first to third tracking target icons and one level icon which are arranged side by side in the left-right direction so as not to overlap each other. Now, suppose that the second and third persons are actually tracked persons and the first person is a tracking lost person. Here, the reliability evaluation values calculated with respect to the second and third tracking target persons by using image data of a tracking target frame image of interest are denoted by $EV_{R2}$ and $EV_{R3}$, respectively. And, suppose that the inequality expression "$EV_{R2} > EV_{R3}$" is satisfied. And furthermore, suppose that the inequality expression "$EV_{R2} \geq TH_1$" and "$TH_2 > EV_{R3}$" are satisfied (that is, the reliability of tracking for the second person is high while the reliability of tracking for the third person is low).

The tracking mode icon displayed in this case is shown in FIG. 19(a), which is displayed superposed on the tracking target frame image of interest. That is, the level icon, the tracking target icon for the second person, the tracking target icon for the third person, and the tracking target icon for the first person are displayed side by side in this order from left to right on the display screen. Since the first person is a tracking lost person, the display position of the tracking target icon for the first person is the farthest from the display position of the level icon (see FIGS. 18(a) and (b)). And colors within the bar icons in the level icon are determined according to the greatest reliability evaluation value $EV_{R2}$. In the example under discussion, since the inequality expression "$EV_{R2} \geq TH_1$" is satisfied, the colors within the first to third bar icons are all set to be the specified color, which is any color that is not colorless.

Or, instead, the tracking target icon for a tracking target person corresponding to the smallest reliability evaluation value may be positioned the closest to the level icon, and the smallest reliability evaluation value may be reflected in the level icon. In this case, the tracking mode icon shown in FIG. 19(b) is displayed and superposed on the tracking target frame image of interest. That is, the level icon, the tracking target icon for the third person, the tracking target icon for the second person, and the tracking target icon for the first person are displayed side by side in this order from left to right on the display screen. And colors within the bar icons in the level icon are determined according to the smallest reliability evaluation value $EV_{R3}$. In the example under discussion, since the inequality expression "$TH_2 > EV_{R3}$" is satisfied, only the color within the first bar icon is set to be the specified color which is any color except colorlessness, and the colors within the second and third bar icons are set to be colorless.

[Seventh Application Example of Display]

Furthermore, in a case in which a plurality of actually tracked persons are present, it is possible to display, as shown in FIG. 20(a), a tracking mode icon 420 having two groups of a level icon and a tracking target icon. The tracking mode icon 420 is formed by arranging a level icon and a tracking target icon belonging to a first group and a level icon and a tracking target icon belonging to a second group side by side in the left-right direction such that they do not overlap each other. A description will be given of a method for generating the tracking mode icon 420 under the assumption that the first to third persons are all actually tracked persons.

Here, the reliability evaluation values calculated with respect to the first to third tracking target persons by using image data of a tracking target frame image of interest are denoted by $EV_{R1}$ to $EV_{R3}$, respectively. And, suppose that an inequality expression "$EV_{R2} > EV_{R1} > EV_{R3}$" is satisfied. Furthermore, suppose that inequality expressions "$EV_{R2} \geq TH_1$" and "$TH_2 > EV_{R3}$" are satisfied (that is, reliability of tracking with respect to the second person is high, while reliability of tracking with respect to the third person is low).

The display control portion 53 identifies the greatest and the smallest of the reliability evaluation values calculated with respect to the actually tracked persons. The display control portion 53 reflects the greatest reliability evaluation value and the tracking color of the actually tracked person corresponding to the greatest reliability evaluation value in the level icon and the tracking target icon belonging to the first group, and the display control portion 53 reflects the smallest reliability evaluation value and the tracking color of the actually tracked person corresponding to the smallest reliability evaluation value in the level icon and the tracking target icon belonging to the second group. The tracking mode icon displayed in this case is shown in FIG. 20(b).

In the case under discussion, $EV_{R2}$ is the greatest reliability evaluation value. Accordingly, the level icon belonging to the first group is generated based on $EV_{R2}$, and the color within the body icon of the tracking target icon belonging to the first group is set to be the tracking color for the second tracking target person. In the example under discussion, since the inequality expression "$EV_{R2} \geq TH_1$" is satisfied, the colors within the first to third bar icons of the level icon belonging to the first group are all set to be the specified color, which is any color except colorlessness (transparency).

On the other hand, $EV_{R3}$ is the smallest reliability evaluation value. Accordingly, the level icon belonging to the second group is generated based on $EV_{R3}$, and the color within the body icon of the tracking target icon belonging to the second group is set to be the tracking color for the third tracking target person. In the example under discussion, since the inequality expression "$TH_2 > EV_{R3}$" is satisfied, in the level icon belonging to the second group, only the color within the first bar icon is set to be the specified color which is any color except colorlessness (transparency), and the colors within the second and third bar icons are colorlessness (transparency).

Incidentally, in the case in which three or more actually tracked persons are present, it is also possible to display a tracking mode icon having three or more groups of a level icon and a tracking target icon. For example, it is possible to display the same number of groups of a level icon and a tracking target icon as actually tracked persons.

[Eighth Application Example of Display]

Furthermore, in a case in which different levels of tracking priority are given to the first to third tracking target persons, the display sizes of the tracking target icons may be different according to the levels of tracking priority.

For example, assume a case in which, as shown in FIG. 16(a), there is generated and displayed a tracking mode icon that is formed of first to third tracking target icons corresponding to the first to third tracking target persons and a level icon, the tracking target icons and the level icon being arranged side by side in the left-right direction such that they do not overlap each other. Under this assumption, if the level of tracking priority given to the first tracking target person is higher than the levels of tracking priority given to the second and third tracking target persons, as shown in FIG. 21 (a), the display size of the tracking target icon for the first tracking target person is made larger than the display sizes of the tracking target icons for the second and third tracking target persons. Furthermore, if the level of tracking priority given to the second tracking target person is higher than that given to the third tracking target person, as shown in FIG. 21(b), the display size of the tracking target icon for the second tracking target person may be made larger than the display size of the tracking target icon for the third tracking target person.

The colors within the bar icons forming the level icon are determined, for example, according to the reliability evaluation value for the tracking target person to whom the highest level of tracking priority is given. Alternatively, the colors within the bar icons may be determined according to the method described in connection with the sixth application example of display (see FIGS. 19(a) and (b)).

Tracking priority may be set in any manner. For example, tracking priority (the level of tracking priority) can be set according to a tracking priority instruction given by the user. The tracking priority instruction is fed to the imaging device 1 by a predetermined operation with respect to the operation portion 17 or the like. Furthermore, in the case in which a priority color is set as described in connection with the second application example of display, a higher level of tracking priority may automatically be given to a tracking target person who has the priority color or a color similar to the priority color as the color of the body region than to tracking target person who does not have the priority color or a color similar to the priority color as the color of the body region.

Alternatively, for example, the face of a person to whom a high level of tracking priority is desired to be given may be stored in the imaging device 1 beforehand as a registered face image. In this case, when a plurality of face regions are extracted from the initial setting frame image, the tracking processing portion 51, based on image data of the registered face image and image data of each of the face regions, evaluates similarity between the registered face image and the image in each of the face regions; and then, the tracking processing portion 51 judges whether or not the plurality of face regions include a face region that gives similarity higher than predetermined reference similarity. If the tracking processing portion 51 judges that a face region that gives similarity higher than the predetermined reference similarity is included, it sets the tracking priority such that a comparatively high level of tracking priority is given to the person corresponding to that face region, while a comparatively low level of tracking priority is given to the persons corresponding to the other face regions.

In the above-described examples, a plurality of tracking target icons are arranged side by side in the left-right direction such that they do not overlap each other; however, as shown in FIG. 22, it is possible to display the plurality of tracking target icons such that they overlap each other in the front-rear direction. A tracking mode icon 440 shown in FIG. 22 is formed of three tracking target icons 441 to 443 which overlap each other in the front-rear direction, and a level icon. The level icon is arranged next to, and not overlapping, the group of tracking target icons in the left-right direction. The tracking target icons 441 to 443 are the first to third tracking target icons corresponding to the first to third tracking target persons, respectively.

Front-rear relationship between the display positions of the tracking target icons 441 to 443 may be determined according to the tracking priority. In the example of display shown in FIG. 22, the first tracking target person is given a higher level of tracking priority than the second and third tracking target persons, and according to this setting of the tracking priority, the first tracking target icon 441 is displayed in front of, and overlapping, the second and third tracking target icons 442 and 443. Thus, the entirety of the tracking target icon 441 is visible, while part of the tracking target icon 442 and part of the tracking target icon 443 are covered by the tracking target icon 441, and thus are not visible to an observer. In other words, the tracking target icon 441 is entirely displayed, while the tracking target icons 442 and 443 are displayed only partly.

[Ninth Application Example of Display]

Furthermore, although the reliability of tracking is indicated by the level icon in the above examples, it may be indicated by the color of the body icon. In this case, the display control portion 53 superposes a tracking mode icon including the tracking target icon alone on a tracking target frame image to generate a display image.

Specifically, for example, in the tracking processing, a reliability evaluation value $EV_R$ with respect to a given tracking target person is calculated by using image data of a tracking target frame image of interest, and the resulting reliability evaluation value $EV_R$ is evaluated with respect to the threshold values $TH_1$ and $TH_2$. And, if the inequality expression "$EV_R \geq TH_1$" is satisfied, it is judged that the reliability of tracking for the given tracking target person is high, and as shown in FIG. 23(a), the color within the body icon of the tracking target icon to be superposed and displayed on the tracking target frame image is set to be a first color. If the inequality expression "$TH_1 > EV_R \geq TH_2$" is satisfied, the reliability of tracking is judged to be of a medium level, and as shown in FIG. 23(b), the color within the body icon is set to be a second color, and if the inequality expression "$TH_2 > EV_R$" is satisfied, the reliability of tracking is judged to be low, and as shown in FIG. 23(c), the color within the body icon is set to be a third color.

The first to third colors are predetermined colors different from each other. For example, the first to third colors are green, yellow and red, respectively. Incidentally, in the case in which reliability of tracking is indicated by the color of the body icon, the color of the body icon cannot be used as the tracking color. Accordingly, in this case, another icon expressing the tracking color may be separately prepared and displayed.

[Tenth Application Example of Display]

Figure 24:
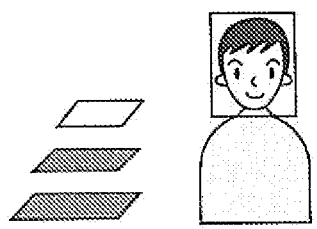

A face icon may be a simple figure image symbolizing a human face, or instead, a face icon may be generated by using an image obtained from the output signal of the image sensor 33. Specifically, when the face region of a tracking target person is detected from the initial setting frame image, the image in the face region itself is used as the image of the face icon. Alternatively, an image symbolizing the face of the tracking target person is generated based on the image data within the face region and the generated image is used as the image of the face icon. FIG. 24 shows an example of a tracking mode icon including such a face icon.

Furthermore, it is possible to make the user select an icon to be used as a face icon from among a plurality of registered icons that is previously recorded in the imaging device 1. The user can register a desired icon to be included in the plurality of registered icons by supplying necessary data to the imaging device 1. Moreover, it is also possible to include a face image shot beforehand by the imaging device 1 in the plurality of registered icons.

Figure 25:
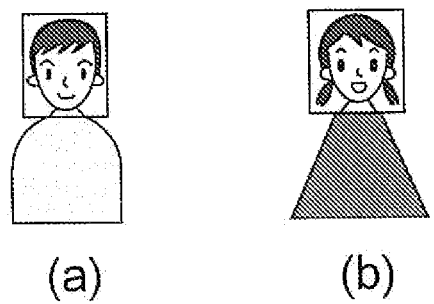
[FIG. 25] Diagrams, in connection with the tenth application example of display, where (a) and (b) show how the shape of a body icon forming a tracking target icon is changed depending on whether a tracking target person is male or female.

Moreover, it is also possible to find the gender of tracking target persons based on image data of frame images, and use different shapes of body icons depending on the gender of the tracking target persons. For example, if a tracking target person is male, the body icon corresponding to the tracking target person has, as shown in FIG. 25(a), a shape that is substantially quadrangle with a curved upper portion; if a tracking target person is female, the body icon corresponding to the tracking target person has, as shown in FIG. 25(b), a shape of a trapezoid placed with its bottom side down (that is, a trapezoid conceptually representing a skirt). Incidentally, gender can be found by using a known method (for example, the method disclosed in JP-A-2004-246456).

Figure 26:
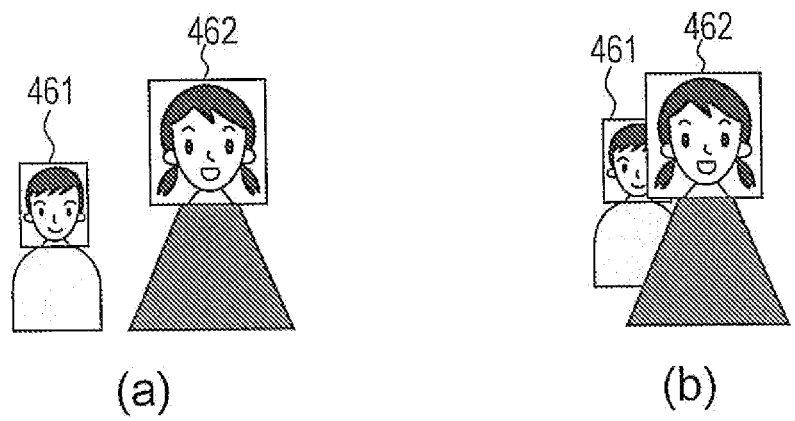
[FIG. 26] Diagrams, in connection with the tenth application example of display, where (a) and (b) show how display sizes of a plurality of tracking target icons differ from each other.

Moreover, it is possible to reflect the size of a tracking target person estimated by the above-described subject size detection method in the size of the tracking target icon. For example, in a case in which first and second tracking target persons are included within a tracking target frame image of interest and it is judged, in the tracking target frame image, that the second tracking target person is larger than the first tracking target person, there is superposed and displayed, on the tracking target frame image, a tracking mode icon as shown in FIG. 26(a) that includes a tracking target icon 461 corresponding to the first tracking target person and a tracking target icon 462 corresponding to the second tracking target person. The display size of the tracking target icon 462 is larger than that of the tracking target icon 461. In FIG. 26 (a), the tracking target icons 461 and 462 are arranged side by side such that they do not overlap each other; however, it is possible to arrange them such that they overlap each other in the front-rear direction as shown in FIG. 26(b), their front-rear positional relation being determined according to the tracking priority (see the eight application example of display).

[Eleventh Application Example of Display]

It is possible to perform the tracking processing by using pattern matching. That is, for example, a face region is extracted from the initial setting frame image, and when a body region is extracted corresponding to the face region, the image of the body region is stored as a template. Thereafter, by searching a tracking target frame image for an image region that is highly similar to the template, the position of a tracking target person on the tracking target frame image is detected (that is, tracking is performed).

In such a case, the tracking mode icon may be formed by using a pattern to be tracked. For example, if a top that the tracking target person wears is lateral-striped, the template is also lateral-striped. In this case, as shown in FIG. 27, it is possible to display a tracking mode icon using an entire or partial image of the template as an image within the body icon.

[Twelfth Application Example of Display]

Furthermore, a motion amount icon indicating how much a tracking target person has moved on an image may be added to any of the hitherto discussed tracking mode icons. In this case, a tracking mode icon including the motion amount icon is superposed and displayed on each of frame images during the tracking processing. When the tracking processing portion 51 finds positional change of the tracking target person between a plurality of tracking target frame images, the motion amount of the tracking target person on the image is found. The motion amount takes a value not less than zero and increases in accordance with increase of the positional change of the tracking target person.

The thus found motion amount is classified into one of a plurality of levels, and the level to which the motion amount belongs is displayed. The motion amount icon is shown in FIG. 28. The motion amount icon is formed of three bar icons 501 to 503. The bar icons 501 to 503 are displayed such that they are arranged in the up-down direction. The first to third bar icons 501 to 503 are each an image of a figure having a shape of a parallelogram.

It is possible to change the colors within the bar icons 501 to 503 in accordance with the motion amount. A method of determining the colors within the bar icons 501 to 503 will be described. Now, an obtained motion amount is denoted by $EV_M$. The main control portion 13 compares the motion amount $EV_M$ with threshold values $TH_{M1}$ to $TH_{M3}$. Here, the relationship $TH_{M1} > TH_{M2} > TH_{M3} > 0$ is satisfied.

And, if the inequality expression "$EV_M \geq TH_{M1}$" is satisfied, as shown in FIG. 29(a), the colors within the bar icons 501 to 503 are all set to a specified color. The specified color used for the bar icons 501 to 503 is a previously set color (for example, red), excluding colorlessness (transparency). If the inequality expression "$TH_{M1} > EV_M \geq TH_{M2}$" is satisfied, as shown in FIG. 29(b), the colors within the bar icons 501 and 502 are set to be the specified color, while the color within the bar icon 503 is set to be colorless. If the inequality expression "$TH_{M2} > EV_M \geq TH_{M3}$" is satisfied, as shown in FIG. 29(c), the color within the bar icon 501 is set to be the specified color, while the colors within the bar icons 502 and 503 are set to be colorless. If the inequality expression "$TH_{M3} > EV_M$" is satisfied, as shown in FIG. 29(d), the colors within the bar icons 501 to 503 are all set to be colorless.

Incidentally, tracking mode icon including only such a motion amount icon and a tracking target icon may be displayed. That is, it is also possible to delete the level icon indicating tracking reliability from the tracking mode icon and display the motion amount icon instead.

Also, instead of independently displaying the motion amount icon, motion amount may be indicated by changing the shape of the level icon in any of the hitherto described tracking mode icons. That is, for example, as shown in FIG. 30, the lengths in the left-right direction of the bar icons forming the level icon are determined such that, the lengths are $L_1$, $L_2$, $L_3$ and $L_4$ if the inequality expression "$EV_M \geq TH_{M1}$" is satisfied, if the inequality expression "$TH_{M1} > EV_M \geq TH_{M2}$" is satisfied, if the inequality expression "$TH_{M2} > EV_M \geq TH_{M3}$", and if the inequality expression "$TH_{M3} > EV_M$" is satisfied, respectively. Here, the length is a length on the display screen, and the relationship $L_1 > L_2 > L_3 > L_4$ is satisfied. In this case as well, the colors within the bar icons forming the level icon can be determined according to the reliability of tracking.

<<Modifications and Variations>>

The specific values given in the description above are merely examples, which, needless to say, may be modified to any other values. In connection with the embodiments described above, modified examples or supplementary explanations applicable to them will be given below in Notes 1 to 3. Unless inconsistent, any part of the contents of these notes may be combined with any other.

[Note 1]

The hitherto discussed embodiments deal with cases in which the tracking target is a person (or a particular portion of a person), but the tracking target may be something other than a person (or a particular portion of a person). For example, the tracking target may be a vehicle such as an automobile, or a robot that moves.

[Note 2]

In the hitherto discussed embodiments, various kinds of processing including the face detection processing and the tracking processing are performed with respect to a series of frame images, with the frame taken as the unit. However, the field may be taken as the unit, and those various kinds of processing may be performed with respect to a series of field images.

[Note 3]

The imaging device 1 of FIG. 1 may be realized with hardware, or with a combination of hardware and software. In particular, the portions referred to by reference numerals 51 to 53 in FIG. 4 are realized in hardware, in software, or in a combination of hardware and software. In a case where the imaging device 1 is built with software, a block diagram showing the blocks realized with software serves as a functional block diagram of those blocks. All or part of the operation processing performed by the portions referred to by reference numerals 51 to 53 in FIG. 4 may be prepared in the form of a computer program, such that the operation processing—all or part—is realized by executing the computer program on a program execution apparatus (for example, a computer).

The invention claimed is:

1. An imaging device, comprising:
   an image sensor which outputs a signal indicating a series of images obtained by sequential shooting;
   a tracking processing portion which, based on the output signal of the image sensor, detects a position of a tracking target on the series of images and thereby tracks the tracking target on the series of images;
   a tracking evaluation portion which, based on the output signal of the image sensor, evaluates a degree of reliability, or of ease, of tracking by the tracking processing portion, and classifies the degree into one of a plurality of levels;
   a display portion which displays the series of images; and
   a display control portion which makes the display portion display an evaluation result by the tracking evaluation portion,
   wherein the display control portion makes the display portion display a tracking target icon corresponding to the tracking target and a level icon indicating the degree which has been evaluated, and further wherein,
   the tracking processing portion performs tracking of the tracking target based on color information of the tracking target, the color information being specified by the output signal of the image sensor, and the tracking target icon has a color corresponding to the color information.

2. The imaging device of claim 1, wherein the tracking target icon is created by using an image based on the output signal of the image sensor or by using an image registered in advance.

3. The imaging device of claim 1, wherein the tracking target icon is created by using an image based on the output signal of the image sensor or by using an image registered in advance.

4. The imaging device of claim 1, wherein the tracking target icon is created by using an image based on the output signal of the image sensor or by using an image registered in advance.

5. An imaging device, comprising:
   an image sensor which outputs a signal indicating a series of images obtained by sequential shooting;
   a tracking processing portion which, based on the output signal of the image sensor, detects a position of a tracking target on the series of images and thereby tracks the tracking target on the series of images;
   a tracking evaluation portion which, based on the output signal of the image sensor, evaluates a degree of reliability, or of ease, of tracking by the tracking processing portion, and classifies the degree into one of a plurality of levels;
   a display portion which displays the series of images; and
   a display control portion which makes the display portion display an evaluation result by the tracking evaluation portion;
   wherein
   the display control portion makes the display portion display a tracking target icon corresponding to the tracking target and a level icon indicating the degree which has been evaluated;
   the tracking processing portion performs tracking of the tracking target based on color information of the tracking target, the color information being specified by the output signal of the image sensor, and the tracking target icon has a color corresponding to the color information; and
   the tracking processing portion performs tracking of the tracking target by first setting a tracking color corresponding to a color which the tracking target has and then tracking an image region having the tracking color in the series of images, and the display control portion sets a color that the tracking target icon has before setting of the tracking color to be colorless or to be a color set beforehand.

6. The imaging device of claim 5, wherein in a case in which a plurality of tracking targets are present as the tracking target, the display control portion makes the display portion display a plurality of tracking target icons corresponding to the plurality of tracking targets.

7. The imaging device of claim 5, wherein the tracking target icon is created by using an image based on the output signal of the image sensor or by using an image registered in advance.

8. An imaging device, comprising:
   an image sensor which outputs a signal indicating a series of images obtained by sequential shooting;
   a tracking processing portion which, based on the output signal of the image sensor, detects a position of a tracking target on the series of images and thereby tracks the tracking target on the series of images;
   a tracking evaluation portion which, based on the output signal of the image sensor, evaluates a degree of reliability, or of ease, of tracking by the tracking processing portion, and classifies the degree into one of a plurality of levels;
   a display portion which displays the series of images; and
   a display control portion which makes the display portion display an evaluation result by the tracking evaluation portion;
   wherein
   the display control portion makes the display portion display a tracking target icon corresponding to the tracking target and a level icon indicating the degree which has been evaluated; and
   in a case in which a plurality of tracking targets are present as the tracking target, the display control portion makes the display portion display a plurality of tracking target icons corresponding to the plurality of tracking targets.

9. The imaging device of claim 8, wherein, in the case in which the plurality of tracking targets are present, when a tracking target which is being actually successfully tracked and a tracking target which is not being actually successfully tracked are included in the plurality of tracking targets, the display control portion uses different display styles for a tracking target icon corresponding to the tracking target which is being actually successfully tracked and a tracking target icon corresponding to the tracking target which is not being actually successfully tracked.

10. The imaging device of claim 8, wherein, in the case in which the plurality of tracking targets are present, when a tracking target which is being actually successfully tracked and a tracking target which is not being actually successfully tracked are included in the plurality of tracking targets, the display control portion places a display position of a tracking target icon corresponding to the tracking target which is being actually successfully tracked closer to the level icon than a display position of a tracking target icon corresponding to the tracking target which is not being actually successfully tracked.

11. The imaging device of claim 8, wherein, in the case in which the plurality of tracking targets are present, the tracking evaluation portion evaluates the degree with respect to each of the plurality of tracking targets, and the display control portion reflects in the level icon a highest degree or a lowest degree, or both the highest degree and the lowest degree, of the degrees evaluated with respect to the plurality of tracking targets.

12. The imaging device of claim 8, wherein, in the case in which the plurality of tracking targets are present, when the plurality of tracking targets are different from each other in level of tracking priority, the display control portion determines display sizes of the tracking target icons according to the level of tracking priority, or the display control portion determines display positions of the tracking target icons according to the level of tracking priority.

13. An imaging device, comprising:

an image sensor which outputs a signal indicating a series of images obtained by sequential shooting;

a tracking processing portion which, based on the output signal of the image sensor, detects a position of a tracking target on the series of images and thereby tracks the tracking target on the series of images;

a display portion which displays the series of images; and a display control portion which makes the display portion display a tracking target icon corresponding to the tracking target, wherein the tracking processing portion performs tracking of the tracking target based on color information of the tracking target, the color information being specified by the output signal of the image sensor, and the tracking target icon has a color corresponding to the color information.

14. An imaging device, comprising:

an image sensor which outputs a signal indicating a series of images obtained by sequential shooting;

a tracking processing portion which, based on the output signal of the image sensor, detects a position of a tracking target on the series of images and thereby tracks the tracking target on the series of images;

a tracking evaluation portion which, based on the output signal of the image sensor, evaluates a degree of reliability, or of ease, of tracking by the tracking processing portion, and classifies the degree into one of a plurality of levels;

a display portion which displays the series of images; and a display control portion which makes the display portion display an evaluation result by the tracking evaluation portion;

wherein the display control portion makes the display portion display a tracking target icon corresponding to the tracking target, the degree, which has been evaluated and classified into one of the plurality of levels, being indicated by a color used in the tracking target icon; and the tracking target icon is created by using an image based on the output signal of the image sensor or by using an image registered in advance.

* * * * *